US007444659B2

(12) United States Patent
Lemmons

(10) Patent No.: US 7,444,659 B2
(45) Date of Patent: Oct. 28, 2008

(54) POST PRODUCTION VISUAL ALTERATIONS

(75) Inventor: Thomas Lemmons, Evergreen, CO (US)

(73) Assignee: Intellocity USA, Inc., San Francisco, CA (US)

(*) Notice: Subject to any disclaimer, the term of this patent is extended or adjusted under 35 U.S.C. 154(b) by 0 days.

(21) Appl. No.: 10/212,289

(22) Filed: Aug. 2, 2002

(65) Prior Publication Data

US 2003/0028873 A1   Feb. 6, 2003

Related U.S. Application Data

(60) Provisional application No. 60/309,714, filed on Aug. 2, 2001.

(51) Int. Cl.
   *H04N 7/10* (2006.01)
   *H04N 7/025* (2006.01)
   *H04N 5/445* (2006.01)
   *G06F 13/00* (2006.01)
   *G06F 3/00* (2006.01)

(52) U.S. Cl. .......................................... 725/34; 725/44

(58) Field of Classification Search ............... 705/60; 725/44, 34
   See application file for complete search history.

(56) References Cited

U.S. PATENT DOCUMENTS

| | | | | |
|---|---|---|---|---|
| 5,353,392 | A | 10/1994 | Luquet et al. | 395/135 |
| 5,515,485 | A | 5/1996 | Luquet et al. | 395/135 |
| 5,543,856 | A | 8/1996 | Rosser et al. | |
| 5,774,666 | A * | 6/1998 | Portuesi | 725/110 |
| 5,929,850 | A | 7/1999 | Broadwin et al. | |
| 6,177,931 | B1 * | 1/2001 | Alexander et al. | 725/52 |
| 6,240,555 | B1 * | 5/2001 | Shoff et al. | 725/110 |
| 6,308,327 | B1 | 10/2001 | Liu et al. | |
| 6,357,042 | B2 | 3/2002 | Srinivasan et al. | |
| 6,446,246 | B1 | 9/2002 | Suto | |

(Continued)

FOREIGN PATENT DOCUMENTS

FR   2 730 837 A   8/1996

(Continued)

OTHER PUBLICATIONS

Aaron Giles, Transparency Notes, Aug. 9, 1994, http://www.mit.edu:8001/people/nocturne/etc/Transparency_notes.html.*

(Continued)

*Primary Examiner*—Hunter B. Lonsberry
(74) *Attorney, Agent, or Firm*—Schwegman, Lundberg & Woessner, P.A.

(57) ABSTRACT

Disclosed is a method and system in which "labels," comprising supplemental information such as advertising, promotional, or informational elements including interactive elements, may be superimposed post-production into a video stream. This can be done by using overlay screens including interactive overlay screens or by combining video segments. As such, the labels do not have to physically be part of the actual scene during filming. Once a video stream is created, a space for available advertising is designated either manually or automatically by pattern recognition techniques. A list of available advertising space is generated. During viewing of television broadcasts, advertisements are placed in the video signal. Labels are displayed by superimposing an HTML page that is blank except for the advertisement onto the video signal. Advertisements can be superimposed post-production, and can be personalized and localized. The advertisements can be customized on a per-household basis.

41 Claims, 19 Drawing Sheets

U.S. PATENT DOCUMENTS

| | | | |
|---|---|---|---|
| 6,446,261 B1 * | 9/2002 | Rosser | 725/34 |
| 6,493,872 B1 * | 12/2002 | Rangan et al. | 725/32 |
| 2002/0010923 A1 | 1/2002 | Pack et al. | |
| 2002/0056090 A1 | 5/2002 | Wagner et al. | |
| 2002/0059117 A1 | 5/2002 | Yoch et al. | |
| 2002/0059590 A1 | 5/2002 | Kitsukawa et al. | |

FOREIGN PATENT DOCUMENTS

| | | | |
|---|---|---|---|
| WO | WO 91 15921 A | 10/1991 | |
| WO | WO 9510919 | 4/1995 | |

OTHER PUBLICATIONS

HTML Support, http://www.citycat.ru/doc/HTML/IExplorer.30/mmedia#Marquee, 1996.*

PCT International Search Report from Ladas & Parry, Dec. 10, 2002.

Written Opinion mailed Feb. 25, 2004 in counterpart PCT/US02/24463.

* cited by examiner

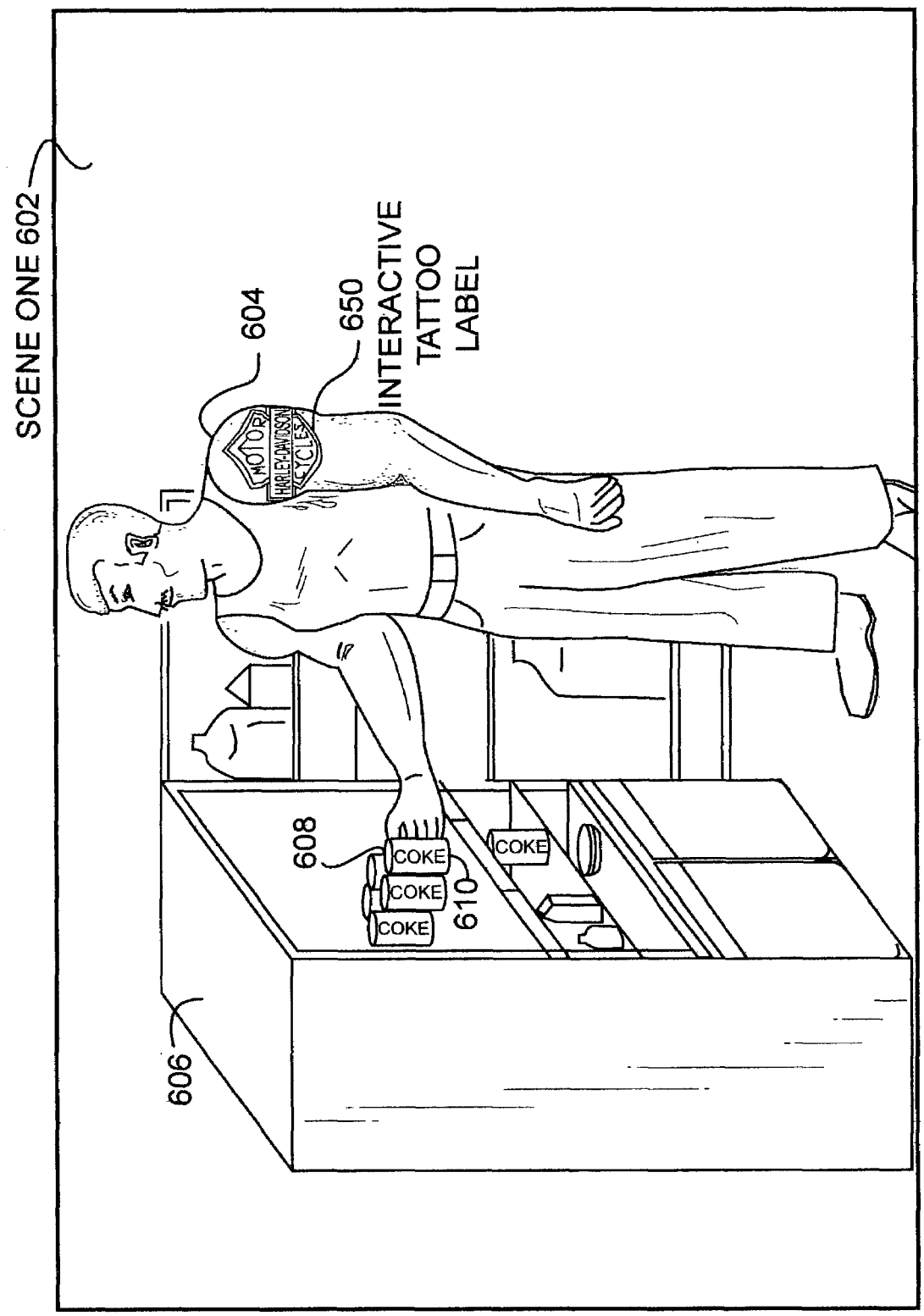

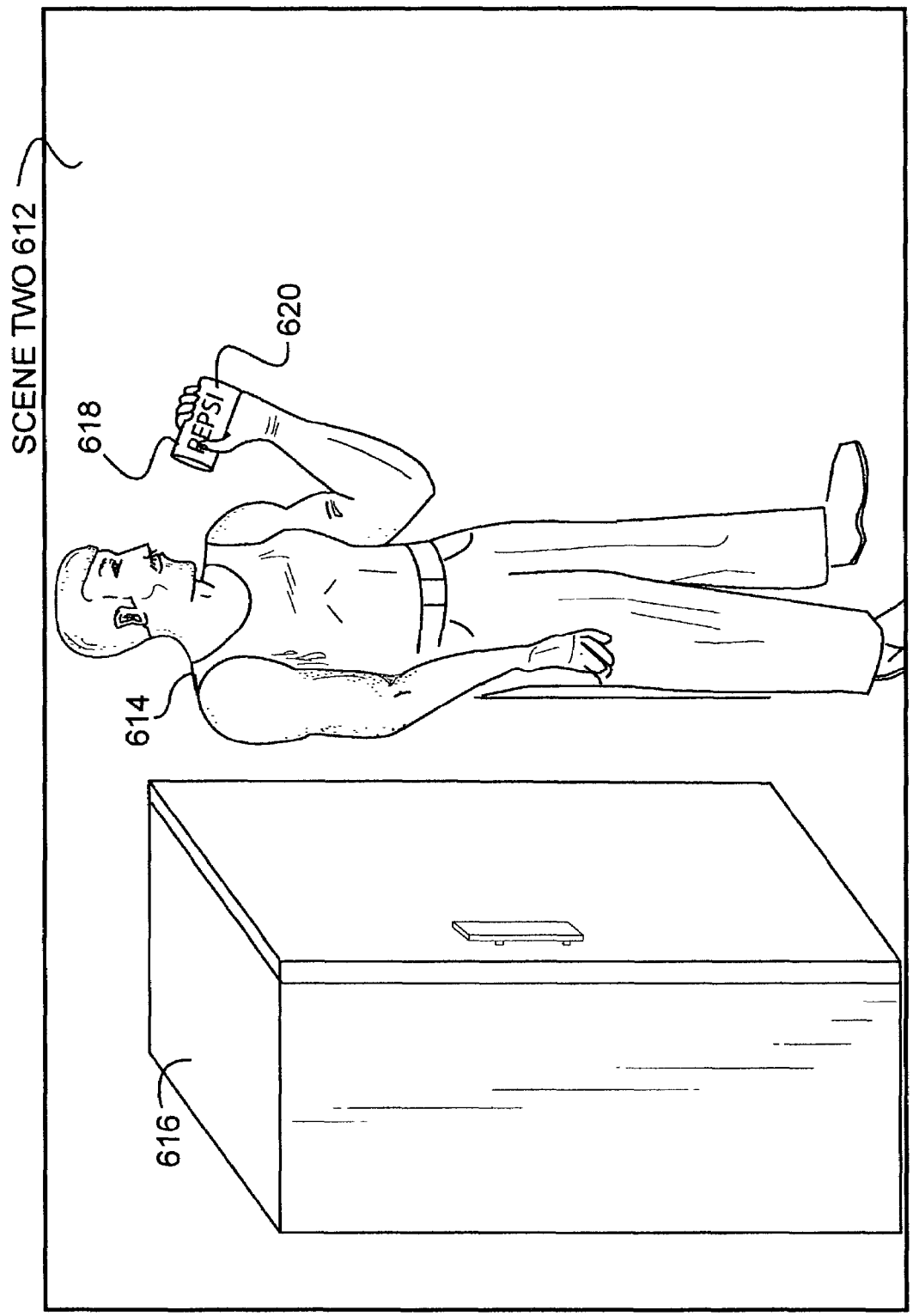

STEPS ILLUSTRATING THE CARRYING
OUT OF THE INSTALLATION OF LABELS
BY AUTOMATIC DESIGNATION OF AD
SPACE AND SEARCHING FOR ACTUAL
OBJECTS

STEPS ILLUSTRATING THE INSTALLATION OF LABELS BY USING TAGS AND MARKERS

POST PRODUCTION VISUAL ALTERATIONS

CROSS REFERENCE TO RELATED APPLICATIONS

This application is based upon and claims the benefit of U.S. provisional application No. 60/309,714, entitled "POST PRODUCTION VISUAL ALTERATIONS", filed Aug. 2, 2001 by Thomas Lemmons, the entire disclosure of which is herein specifically incorporated by reference for all that it discloses and teaches.

BACKGROUND OF THE INVENTION a. Field of the Invention

The present invention pertains generally to video information and more particularly to post-production visual enhancements and modifications.

b. Description of the Background

Currently, both local and national television commercials are placed in 30-second blocks during television shows. These advertisements provide the financial backing of modern television. However, with growing viewer intolerance of these ads along with technological advances, such as the use of personal video recorders, viewing of advertisements is decreasing. Thus, companies have expanded into embedded advertising, such as selectively placing a product in the hands of a television personality during the programming interval. In this manner, companies with national advertising budgets can promote products/services in a less intrusive manner.

If such embedded advertising was more versatile in nature, such advertising could have a widespread impact on the way products are promoted. Current methods of embedded advertising are part of the original video production and do not have such versatility. In addition, embedded advertising is very expensive and inflexible because it must be included in the original recording. Currently, local affiliates and smaller cable systems do not provide any way to embed advertising, and therefore, cannot offer embedded advertising. Further, once embedded advertising is included in a video production, there has been no effective way to remove or alter such advertising.

A need therefore exists for providing more flexible embedded advertising in a simple and inexpensive manner. In that regard, the term "advertisement" can refer to various forms of visual alteration to the video display, including, but not by way of limitation, any type of informational visual alterations of the video content. Content may include any type of visual information on any desired medium capable. Content may comprise various types of data.

Other procedures have included techniques for "on-content" enhancements, such as the use of "hot spots" as disclosed in U.S. Provisional Application serial No. 60/243,107, filed Oct. 24, 2000 entitled "CREATING ON-CONTENT ENHANCEMENTS", now U.S. Non-Provisional application Ser. No. 10/041,881, filed Oct. 24, 2001 having the same title, both of which are specifically incorporated herein by reference for all that they discloses and teach. In accordance with the above referenced application, various elements of a particular scene may have a "hot spot" (enhancement) associated with the element. These hot spots may be presented in a number of ways such as with a colored border, a colored spot, a dim pulsating border, graying of the actual object, or by any number of other presentation schemes that distinguish the hot spot from a traditional video display element.

The hot spot, which acts as an interactive link, appears directly over the object, and may appear as part of the object, in a particular scene. For example, if during a television episode the characters are eating pizza, the hot spot, in the form of a colored border, spot or other scheme may appear over or on the pizza box. Activation of the hot spot by a cursor or pointer links the viewer to the local pizza company so that the viewer can interactively order a pizza while watching the show.

SUMMARY OF THE INVENTION

The present invention overcomes the disadvantages and limitations of the prior art by providing a method and system in which "labels," comprising supplemental information such as advertising, promotional, or informational elements including interactive elements (i.e., "Hot Labels™"), may be superimposed into a video stream after production of the video. In other words, the labels are not embedded in the video and may be altered or replaced. This can be done by using overlay screens including interactive overlay screens or by combining video segments. As such, the labels do not have to physically be part of the actual scene during filming. For example, a label may be a person's name stenciled on their forehead or shirt/jersey, changes in color, pattern, or texture within the video presentation, changes in the contour and/or placement of objects within the video presentation, or other changes, or forms of advertising that are applied to blank portions of the video scene, or which replace and obscure portions of the video scene.

The present invention may therefore comprise a method of superimposing a label that contains informational material onto pre-existing video content to supplement the pre-existing video content comprising, detecting a suitable location on the pre-existing video content for placement of the labels, selecting the label for placement on the preexisting video content, superimposing the label onto the pre-existing video content so that the label appears as an integral part of a unified video signal.

The present invention may also comprise a system for superimposing labels onto pre-existing video content to provide a video signal that includes information to supplement the pre-existing video content comprising, a video signal that contains the pre-existing video content, a label signal that contains the information to supplement the pre-existing video content, a logical system that superimposes the label signal on the preexisting video content.

An advantage of the present invention is that broadcast and cable companies are able to provide embedded advertising in a post-production environment in a simple and easy manner. Labels can be unobtrusive, noninvasive and may not compromise size, color, or continuity of the video content. Embedded advertising can be changed from scene to scene and from viewing to viewing. As products become outdated, new products and objects can be superimposed (overlaid) in the video signal to update broadcast impact. Specific viewers can view individualized and targeted labels based on demographics that can be as individualized as finely as a per-household or per viewer basis. With this individualization, local broadcasts can also exploit the advantages of embedded advertising.

BRIEF DESCRIPTION OF THE DRAWINGS

In the drawings,

FIGS. 6a and 6b are illustrations of scenes showing other implementations of the present invention.

DETAILED DESCRIPTION OF THE INVENTION

Figure 1:
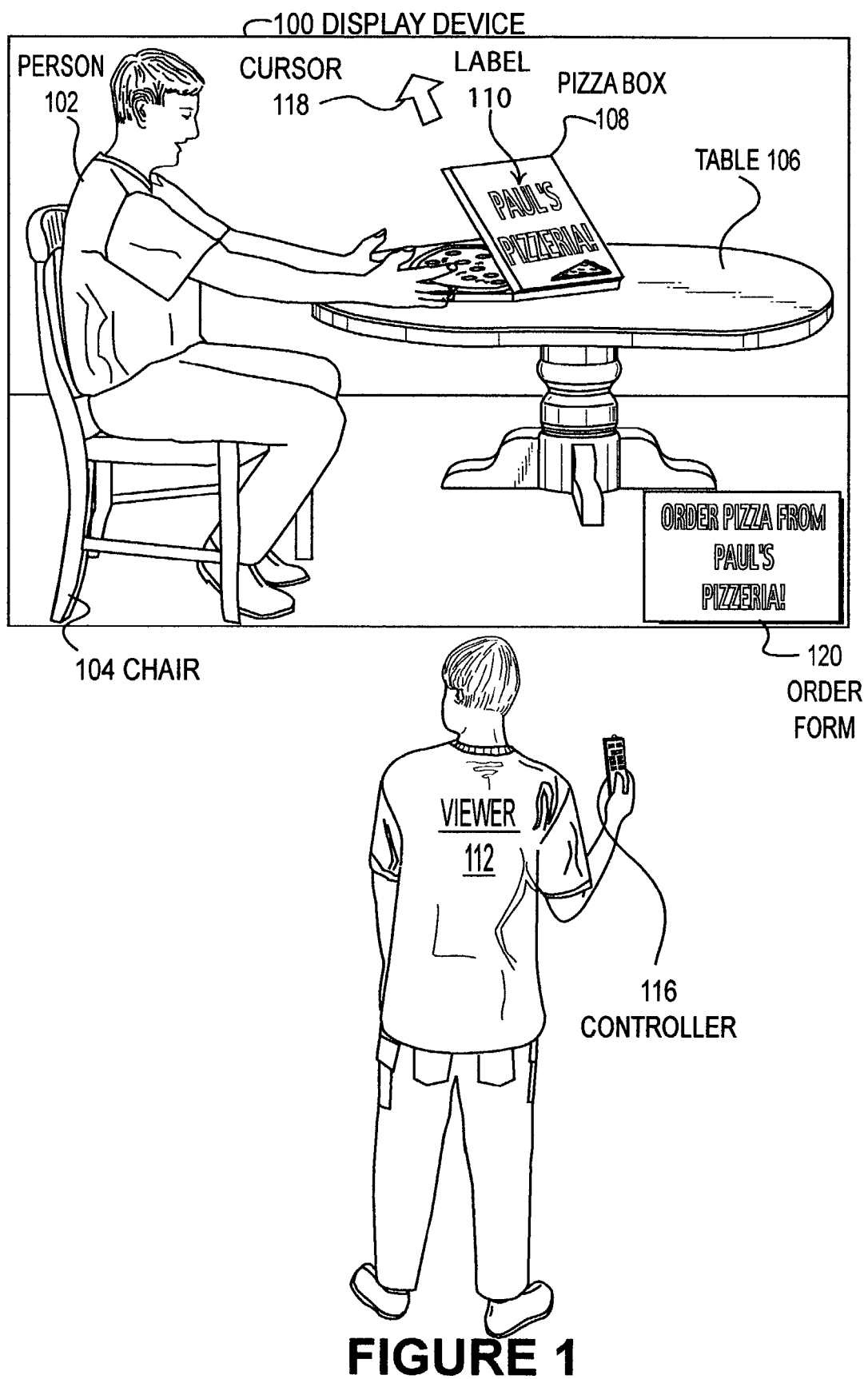
FIG. 1 is an illustration of one implementation of the present invention.

FIG. 1 is an illustration of one implementation of the present invention. Referring to FIG. 1, a scene in the video is being displayed. The video may be displayed on a display device 100, such as a television set, which may comprise any type of display such as a plasma display, flat panel display, CRT monitor, or any other display. The video may also be displayed on a computer monitor displaying labels within video streams over the Internet, or the video may be displayed on any other type of display system/device including movies displayed at movie theaters. In the scene, a person 102 is shown as sitting on a chair 104 at a table 106. The person 102 is seated in front of an object, such as a pizza box 108, from which the person is eating pizza. The object, or pizza box, may be automatically identified by some existing technique such as pattern recognition software, as will be discussed in more detail in FIG. 13. Alternatively, tags and markers, as disclosed in the above referenced patent applications, may be supplied in the video stream that provides the object identification information (pizza) and location of the object in the video stream. The system may then determine if a pizza advertiser has been listed as a label advertiser. That is, a list may be compiled that comprises advertisers who wish to exhibit advertisements, in the form of labels, in the current video presentation. The list of advertisers may also include the item (attribute), which may be in the form of a product, idea, etc., that the advertisers wish to promote. Such a list of advertisers and attributes may be stored in a database. This database may be stored in a server at the head-end (transmission site), retransmission site, set-top box, or other site. The list of advertisers and attributes is more fully disclosed with regard to the description of FIG. 3.

Referring again to FIG. 1, once an object, in this instance a pizza box 108, is recognized, the advertiser list may be queried for a pizza advertiser. If a pizza advertiser has been listed as a label advertiser, a label, which may be in the form of a logo, text, or other form of advertisement for the advertiser, is graphically displayed (superimposed or overlaid) on the pizza box. The process of applying, or superimposing, the label on the pizza box is discussed in further detail with regard to the description of FIG. 13. The label may comprise any form of video enhancement, including video sequences, text, graphical images that may be in bitmap format or any other format, or other graphical representation. If the label is a "hot label," the viewer may then click on the hot label to order a pizza from that advertised store. Details of this process are further discussed with respect to FIG. 13.

Labels may comprise enhancements to the original video signal, such as improvements, augmentations or new additions. For example, a company logo may be applied to a soda-can. The soda-can may already exist within the original video signal, or the soda-can may be an addition to the original signal. Alternatively, changes may comprise downgrades from the original video signal, such as degradations, reductions, or deletions. For example, a portion of the video may be "erased" in order to create a blank space, which may be used for applying labels or displaying advertisements.

Labels may be applied to any type of video content and video signals such as live or taped a television broadcasts, animation, filmed video and the like or may be captured as a magnetic or optical media file, such as in a Digital Video/Versatile/Variable Disc (DVD) feature-length film. Labels may also comprise informational content such as markings. Content may be created by taping or filming, such as the filming of a live broadcast, a feature-length film, a television program, or other presentation. Content may also be created using animation. Cartoons on television or on feature-length films are one example of animation. Content creation may comprise computer animation. Computer animation is a principal component of multimedia presentations including feature-length films, and many software applications can be used to create animations that can be displayed on any display device, such as a computer monitor, television screen, or movie screen.

Of course, labels may be applied to any form of viewing material, including educational programs, multimedia presentations, or entertainment presentations. Such multimedia or entertainment presentations may include digitally enhanced or computer enhanced presentations, animated presentations, which may include feature-length animated films, animated programs that are broadcast over a television network, DVD animated presentations, or other forms of animated presentations. Additionally, labels may be applied to such multimedia or entertainment presentations as feature-length video films that may be shown in movie theatres, perhaps in a digital format, over fiber-optic connections, through laser technology, or through other technology.

As mentioned above techniques to facilitate supplementary content in a video signal can also be accomplished by combining video signals. Such a technique is disclosed in U.S. Provisional Application serial No. 60/278,669, filed Mar. 20, 2001 entitled "DELIVERY OF INTERACTIVE VIDEO CONTENT USING FULL MOTION VIDEO PLANES", now U.S. Non-Provisional application Ser. No. 10/103,545, filed Mar. 20, 2002 entitled "VIDEO COMBINER", both of which are specifically incorporated herein by reference for all that they discloses and teach. In accordance with the above referenced application, the system is capable of combining video signals that incorporate labels at the viewer's location. For example, multiple video feeds, some of which can include labels, are provided to a viewer's set-top box together with instructions for combining two or more video feeds. The video feeds can then be combined in a set-top box or otherwise located at or near the viewer's location to generate the combined or correlated video signal for display with labels.

Additionally, one or more video feeds can comprise enhanced video that is provided from an Internet connection. HTML-like scripting can be used to indicate the layout of the enhanced video signal. Instructions can be provided for replacement of particular segments comprising the label space, to make an interactive label.

Hot labels (interactive labels) can appear unobtrusively during a television broadcast. As disclosed above, the label itself can be an interactive element which is placed on specific objects that relate to the advertising element, or in a blank portion of the screen. As also disclosed above, labels may not be interactive, i.e., labels may exist simply as an advertisement or informational material that is part of the video stream. Insertion of video content to produce combined video streams, as well as insertion of interactive content can be accomplished by using tags and markers inserted into the video stream as disclosed in U.S. Provisional Application serial No. 60/268,350, filed Feb. 12, 2001 entitled "VIDEO TAGS AND MARKERS", now U.S. Non-Provisional application Ser. No. 10/076,950, filed Feb. 12, 2002, both of which are specifically incorporated herein by reference for all that they disclose and teach.

Labels that are interactive links can allow for superimposition of interactive label information on products. Labels may appear as a visual enhancement, such as a logo or name, and thus an advertisement, of any party, or advertiser, such as a local or national company, or simply informational. Labels can also be individualized, localized advertisements. An embodiment may employ pattern recognition techniques that provide an automated method of identifying objects on which to place labels that pertain to the object. Labels may be localized to a point where specific advertisements can be superimposed from set top-boxes, so that advertising can be personalized down to the household level.

Furthermore, labels may be applied by a viewer. Viewer is a person watching the content, which may be a video signal. The viewer may apply labels to television programs, DVD movies, or presentations created in other mediums, within the viewer's own home. Thus, the application of labels may not be restricted to video signals, but labels may be applied to any type of signal, and any type of medium.

Labels may be applied to content by creating "label space," or space within the content (which may be a video stream), that is available for application of a label. The designation of such label space may be completed by manual or automatic methods. The label or type of label to be superimposed may be chosen based on "attributes," as further explained with regard to the description of FIG. 3. A list of advertisers, along with the advertisers' associated attributes, may be stored in a database. "Attributes" are a class of actual objects, or blank spaces that may be associated with an advertiser or with types or classes of information. A label may be applied, to the label space within the video stream, according to the class of object or blank space identified within the video stream. The identified object or blank space (within the video stream) may be compared to objects, classes of objects or blank spaces listed as attributes within the aforementioned database. Once a matching actual object or blank space is found, an appropriate label is chosen and applied to the label space within the video stream.

Referring again to FIG. 1, the label 110 appears as a logo of a local franchise called "Paul's Pizzeria." The label may be an actual logo, name, or advertisement of a company that can be either a local company or national chain and may exist as a non-obtrusive advertisement that appears to be an actual element of the originally filmed scene. The label 110 appears as a logo on the actual pizza box, thus appearing completely naturally in the scene. The label 110 may exist as a non-interactive enhancement that is part of the video signal, and thus the label may simply exist as an advertisement, or the label may be an interactive element that has the functionality to be activated by the viewer, thus acting as an advertisement and interactive tool.

Again referring to FIG. 1, if the label 110 is interactive, the label may be activated by the viewer 112. As previously described, the "viewer" is a person watching the video. Activation of the label 110 may occur in several ways, including toggling through a series of labels using control buttons on some form of a hand-held control device 116, such as a remote-control activating a cursor 118, using a wired or wireless mouse, or by other means including but not by way of limitation, light beams, such as IR beams that can be used as pointers to point at labels. Such a system may operate in a fashion similar to a touch screen that identifies the light beam rather than a users finger. A cursor 118 may be an indicator, such as a spot, a flashing line, an arrow, a symbol, or any other indicator, that is displayed on the TV screen 100. The cursor position may be controlled by another form of a hand-held control device, such as a wired mouse or a wireless mouse (not shown) in a similar fashion to that of a mouse being connected to a computer and monitor. Once activated, the label may make available a host of options, including bringing up an order form 120, which may allow the viewer to begin the process of directly ordering a pizza. The order form 120 may appear on an unused portion of the TV screen 100, thereby causing no interruption of the current video presentation.

Figure 2:
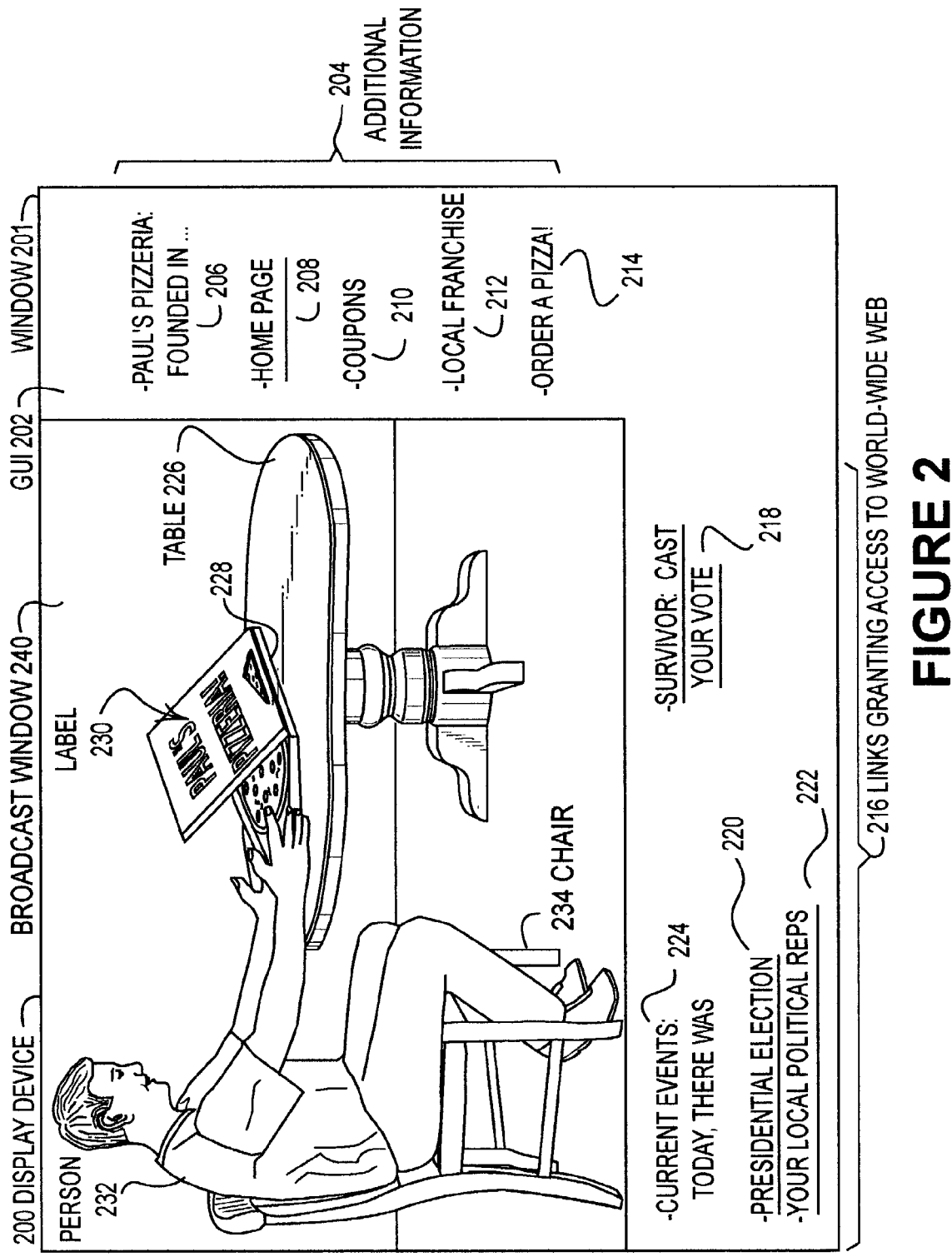
FIG. 2 is an illustration of the manner in which interactive content may be displayed.

FIG. 2 is an illustration of the manner in which interactive content may be displayed. Once activated, the label (as referred to in FIG. 1) may display information in an enhanced content window or border area 201. The current video presentation shown on display device 200 may remain viewable in the broadcast window 240. As shown in FIG. 2, the displayed video that includes the same objects that appeared in FIG. 1, including the table 226, pizza box 228, label 230, person 232, and chair 234, remain visible. Alternatively, the information brought up by the label may be displayed on a completely separate page. The label may bring up a graphical user interface (GUI) 202, a text box, or some other presentation scheme that serves to present information in some manner to the viewer. The GUI 202 may present additional information 204 about the company for which the label has been activated. Such additional information may be submitted by the advertiser or by the author (person examining and/or editing the video signal.) The additional information 204 may be contained in a separate storage device, such as a database. The database containing additional advertiser information is more fully disclosed with regard to the description of FIG. 3a. Once a label is activated, this corresponding database can be accessed for the additional information. The separate database may be located in a central computer, or on multiple computers, which may be a server at the head-end, a retransmission site, other site, or in the household of the viewer in a set-top box. The central computer is more fully disclosed with regard to the description of FIGS. 7 and 8. The central computer applies the label. Application of the label is discussed in further detail in FIG. 13.

Figure 7:
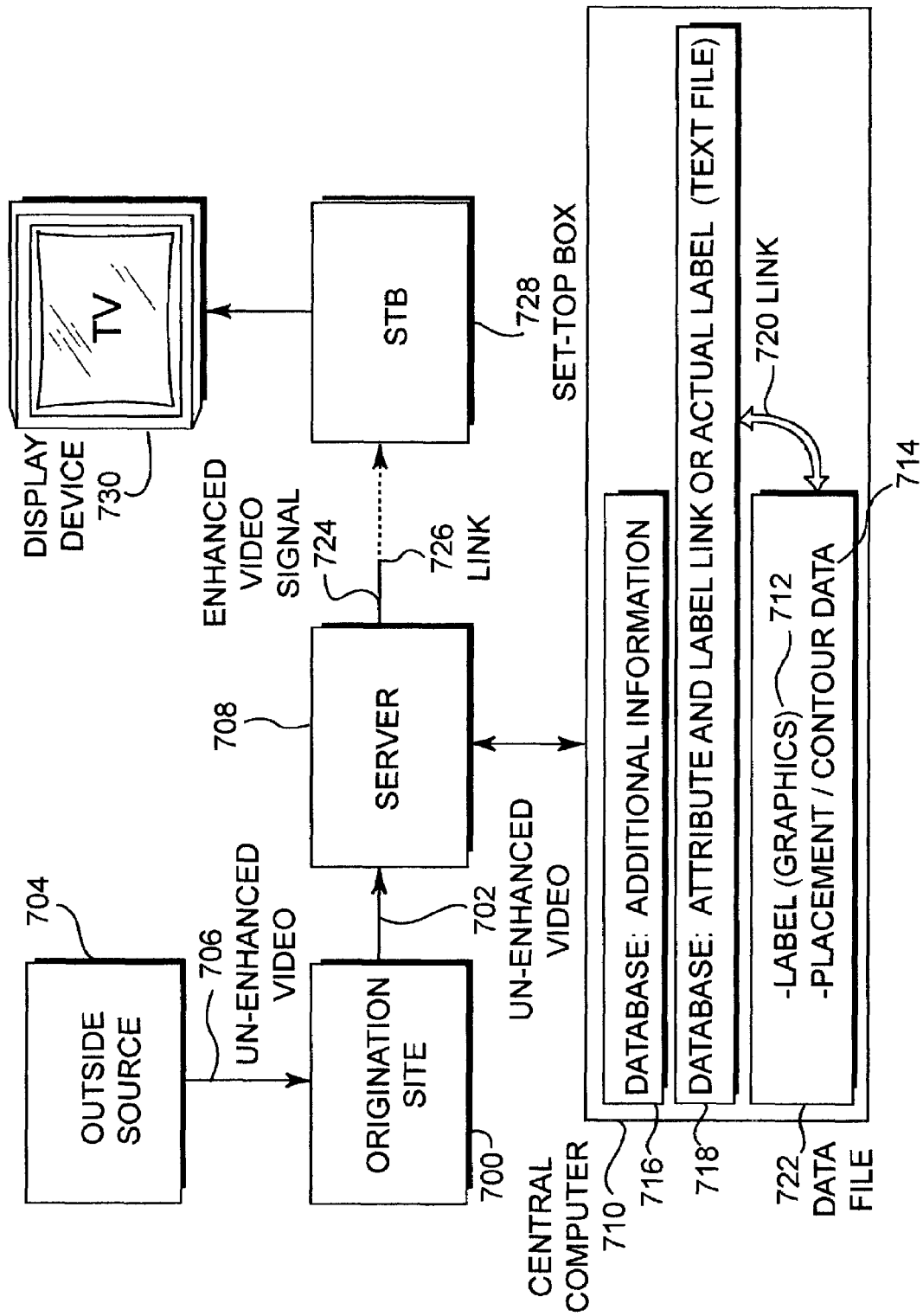
FIG. 7 is a schematic block diagram that generally illustrates one embodiment of the present invention.

Referring again to FIG. 2, the additional information 204 may include company profile 206, web address 208, coupons 210, or other information. The web address 208 may simply be an address that is non-interactive and is simply there for the viewer to take note of and to have the opportunity to visit that address at a later time, or the web address may act as a direct, interactive link. The interactive link 208 may link the viewer to the company home page, or the company website that allows the viewer to make a purchase 214. That is, the "order a pizza" website 214 may be a special website designed specifically for viewer interaction with labels. In addition, if the advertiser is a national company, the additional information may include local distributors or franchises 212 of the national company. The label may provide a link to the local server to provide information regarding the local store. For example, if Paul's Pizzeria is a national chain, the local broadcaster may superimpose the local franchise of Paul's Pizzeria at the server at the head-end, as illustrated in FIG. 7. The viewer, when clicking on the label, will see their local Paul's' Pizzeria in the additional information display, and be able to order a pizza directly from their local store.

Furthermore, the viewer may also have the choice of accessing links that have nothing to do with the current video presentation. For example, on a different part of the graphical user interface 202, the viewer may be able to activate links 216 that facilitate access to the world-wide-web. For example, the viewer may be able to cast a vote 218 on which character the viewer liked the best during a particular television program such as the "Survivor" series. The viewer may also be able to cast a vote 220 for elections, read about their local political representatives by clicking on an interactive link 222 and entering their local information, or even read about current world events 224.

Figure 3A:
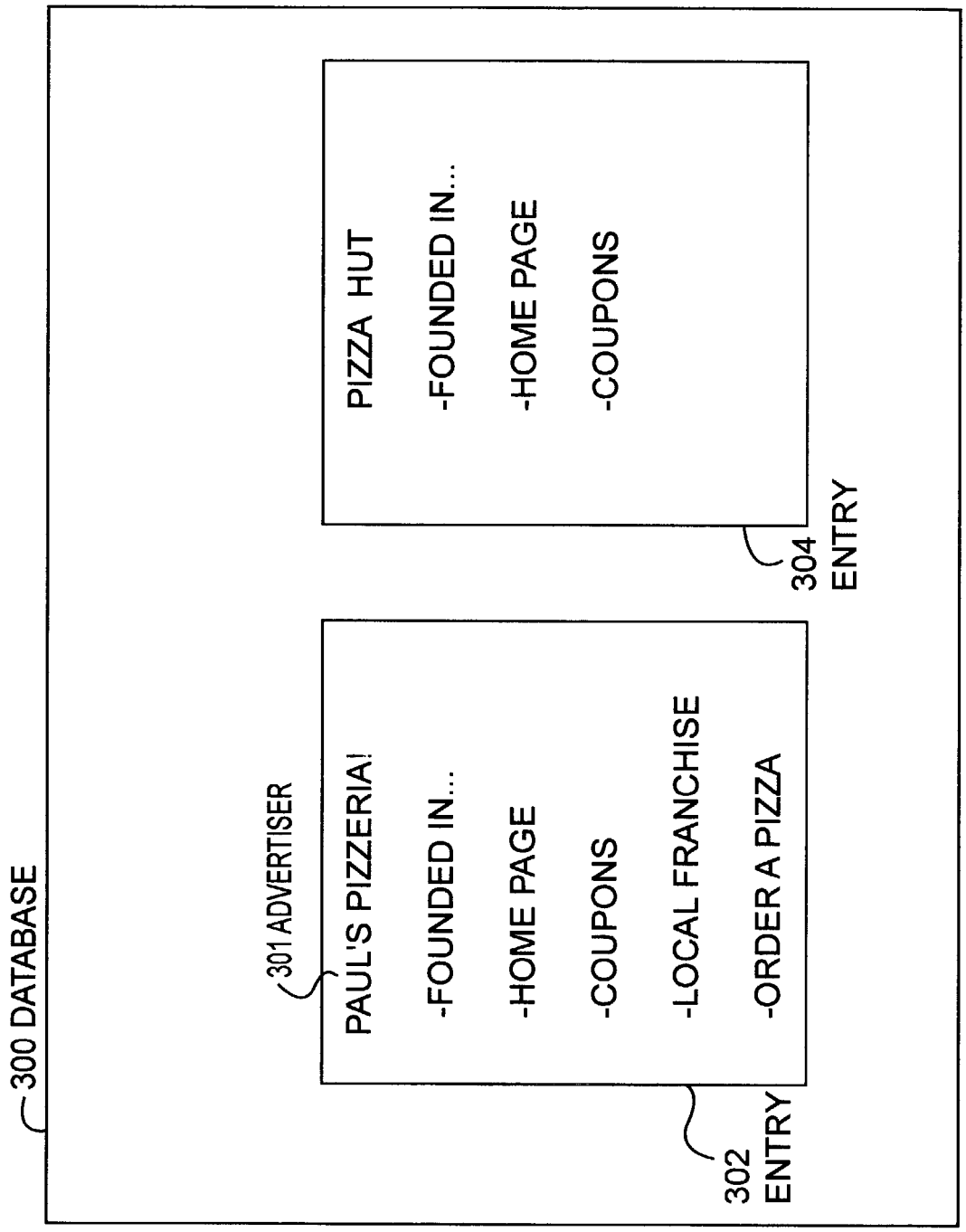
FIG. 3a is a graphical representation of a database that provides a list of additional information associated with advertisers.

FIG. 3a is a graphical representation of a database that provides a list of additional information associated with advertisers, as listed in database 300. As previously mentioned with regard to the description of FIG. 2, the additional information of an advertiser may be contained in a storage device, such as a database 300. As illustrated in FIG. 3a, such additional information may be submitted as an entry 302. For example, one entry may be for the advertisers name, Paul's Pizzeria 301, with additional associated information that may include company profile, web address, coupons, or other information. The additional information may be submitted by the advertiser and/or by the author. Additionally, other advertisers may be stored in the same database along with similar information, as a separate entry 304.

Figure 3B:
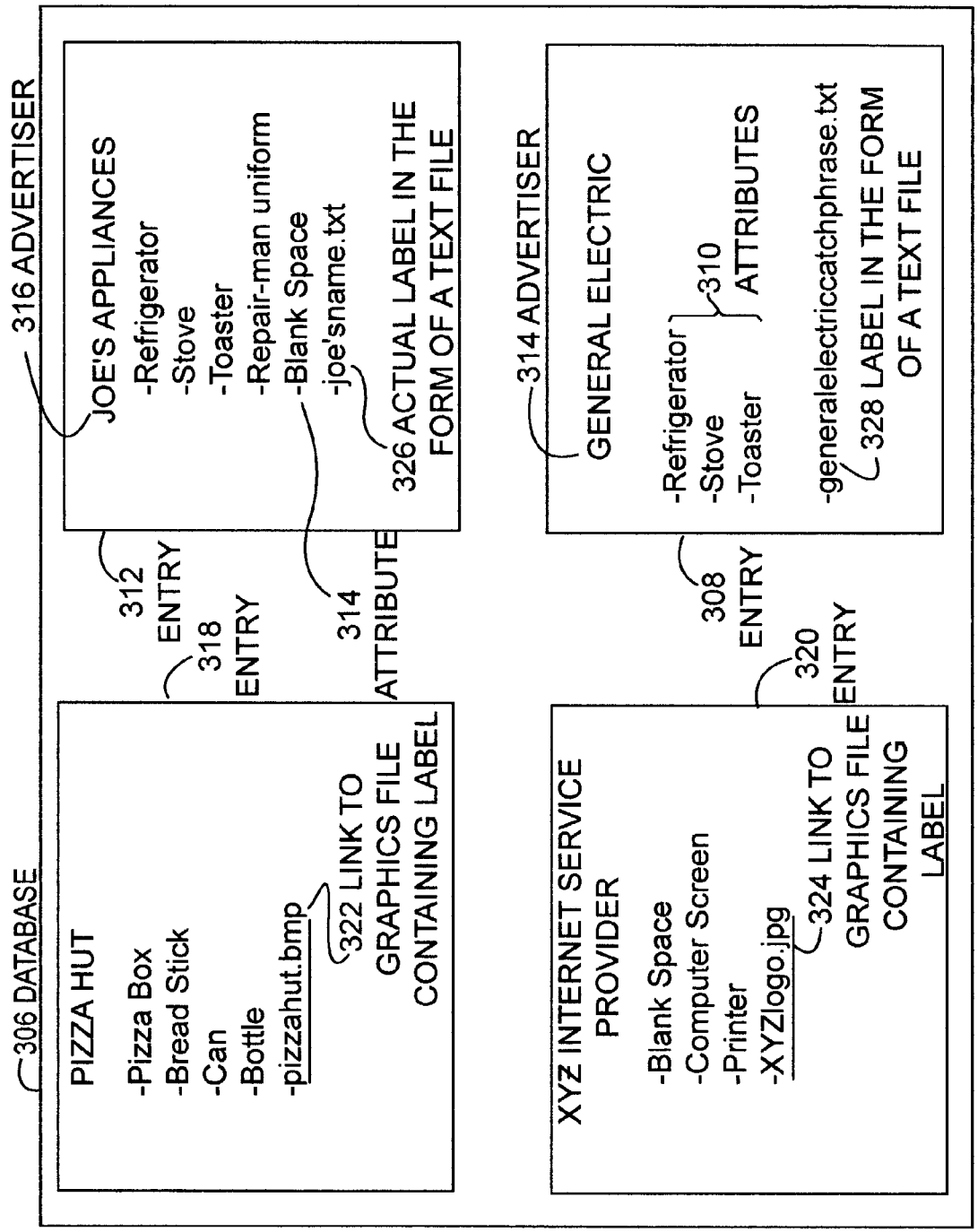
FIG. 3b is a graphical representation of a database that provides a list of attributes associated with advertisers.

FIG. 3b is a graphical representation of a database that provides a list of attributes associated with advertisers, as listed in database 306. Database 306 may also contain a label itself, or a link to a label. Referring to FIG. 3b, in order to paint the label onto a particular object or even onto a blank space, there must be a determination of whether or not there is an appropriate label to apply. Thus, a, list of advertisers is stored in a storage device, such as a database 306, along with associated attributes. "Attributes" are defined as any actual object or categories of objects that are associated with the advertiser, or "blank space," which will subsequently be explained. Attributes may be submitted by the advertiser and/or by the author. Referring to FIG. 3b, an advertiser, as may be seen as one entry out of many, is stored in the database 306. For example, the advertiser General Electric 314 may be an entry 308. General Electric may be accompanied by a list of attributes 310. Such attributes 310 may include actual objects, such as "stove," "refrigerator," "toaster," and other actual objects or categories such as appliances, etc. Alternatively, advertisers may wish to have the opportunity to advertise on an available blank space; in this case, the advertiser may submit "blank space" as one of their attributes. For example, the advertiser Joe's Appliances 316, as seen in entry 312, may elect to list "blank space" 314 as an attribute, which would allow Joe's Appliances the opportunity to be chosen out of one or more advertisers to advertise on a blank space in the video content as well as to apply an advertisement to an actual object. Blank space may be further constrained to specific areas such as "the dasher boards below the Colorado Avalanche hockey bench." Blank space advertising is more fully disclosed with regard to the description of FIG. 5. Additionally, other advertisers may be stored in the same database along with similar information, as other entries such as 318 and 320. In addition, this database may store the file name of and/or link to a label graphics file, which may be stored in a separate location. Alternatively, the database may contain label text files 326, 328. These concepts are more fully disclosed with respect to the description of FIG. 7. The manner in which a company is chosen as an advertiser using a label is discussed in greater detail in FIG. 13. If the system of the present invention finds a pizza advertiser in the list of advertisers, a label is painted onto the identified pizza box, at which time the viewer may click on the label and order a pizza. The process of applying the label is discussed in greater detail in FIG. 13.

Figure 4A:
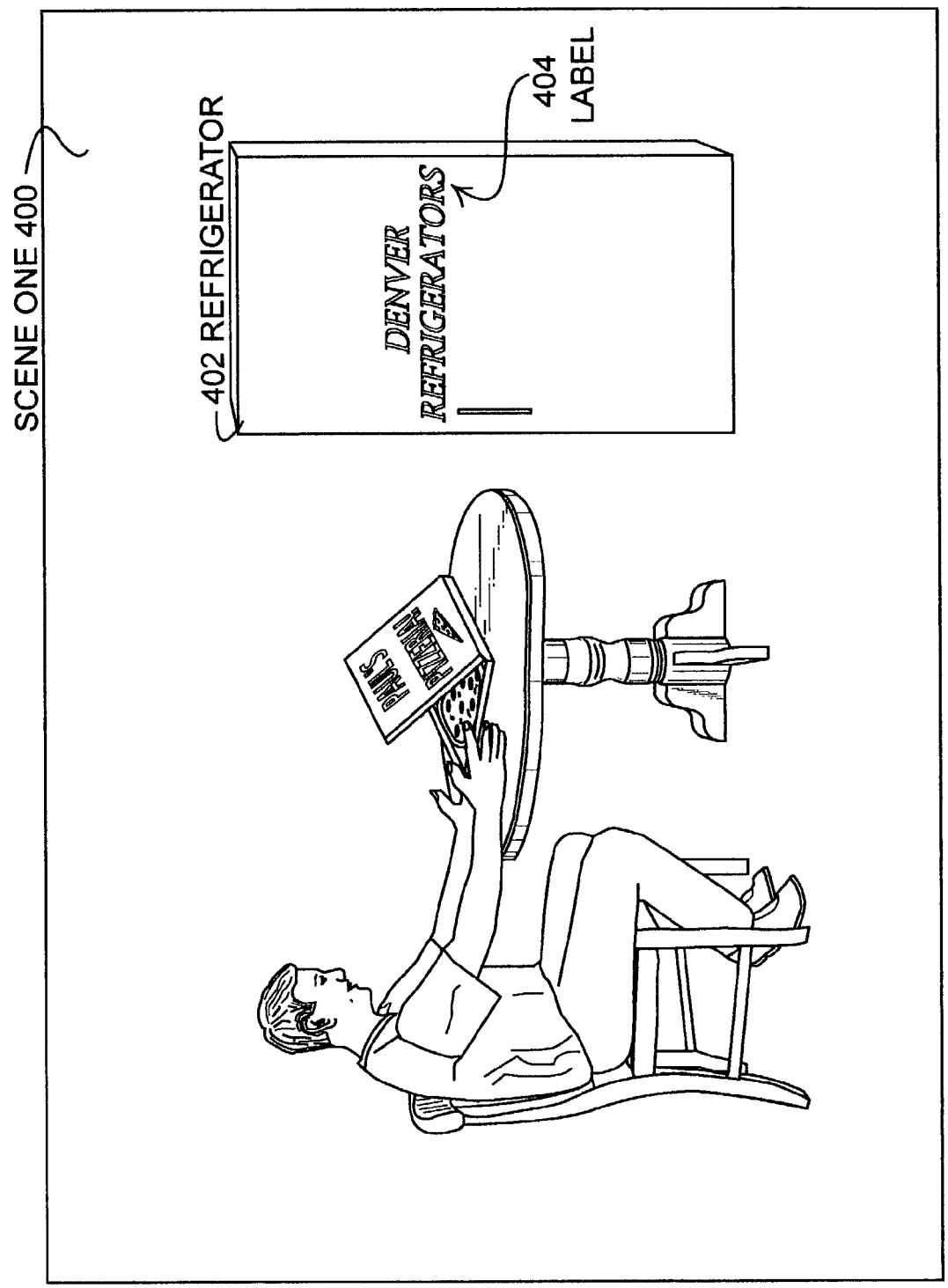
FIGS. 4a and 4b are illustrations of scenes showing other implementations of the present invention.
Figure 4B:
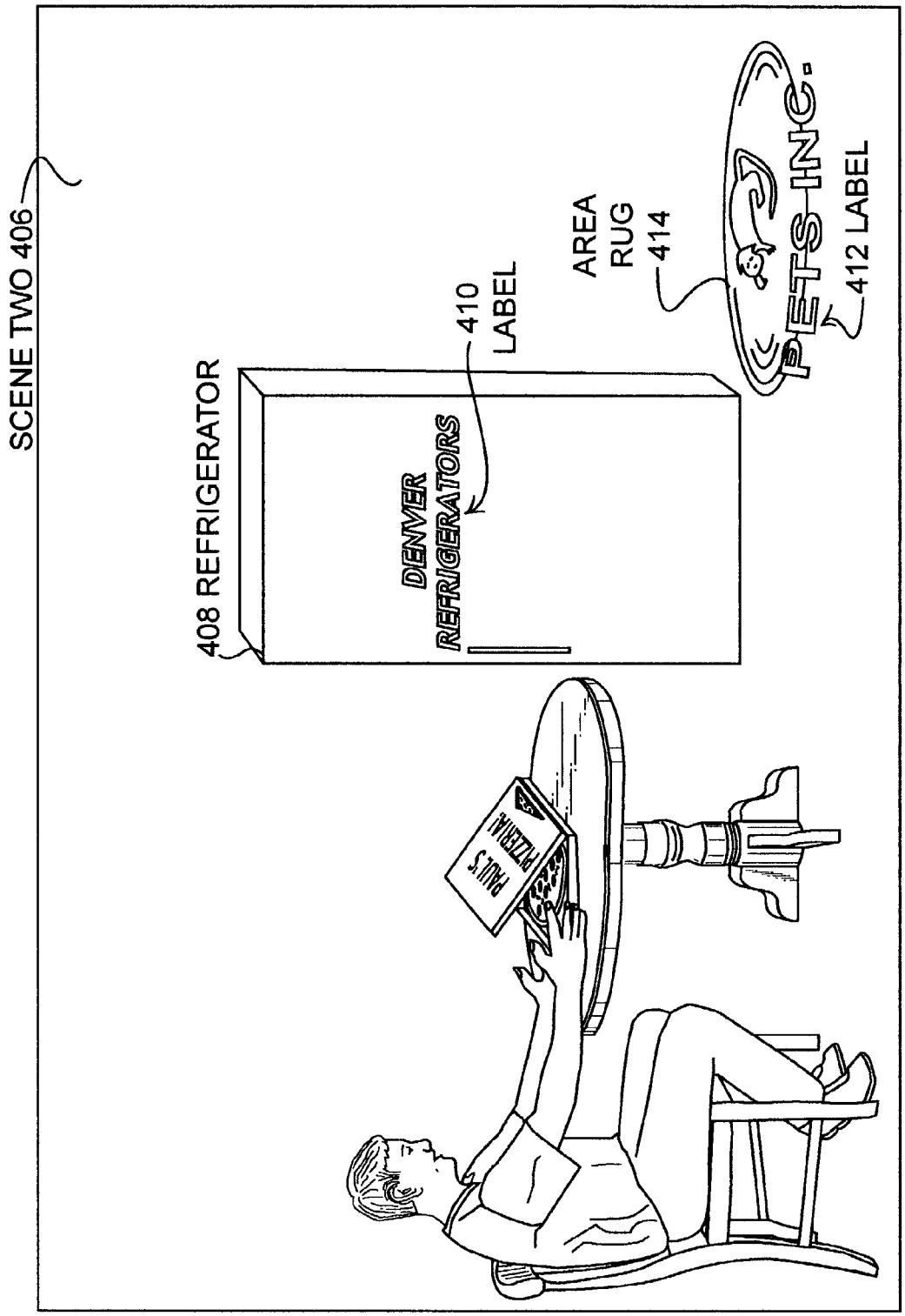

FIGS. 4a and 4b are illustrations of scenes showing other implementations of the present invention. Labels can be coded to change on a per-scene basis. As illustrated by FIG. 4, in a current scene 400 of a television show, a refrigerator 402 may be superimposed (overlaid) with a label 404. In the second scene 406, the camera angle is different, which changes the position of the refrigerator 408. During this scene, the label 410 would remain on the refrigerator. Furthermore, instead of the label appearing as a normal part of the scene as illustrated by labels 404 and 410, a label 412 may appear larger and more apparent, such as text written outside the boundaries of the area rug 414, thus appearing to the viewer as an obvious part of the scene.

Figure 5A:
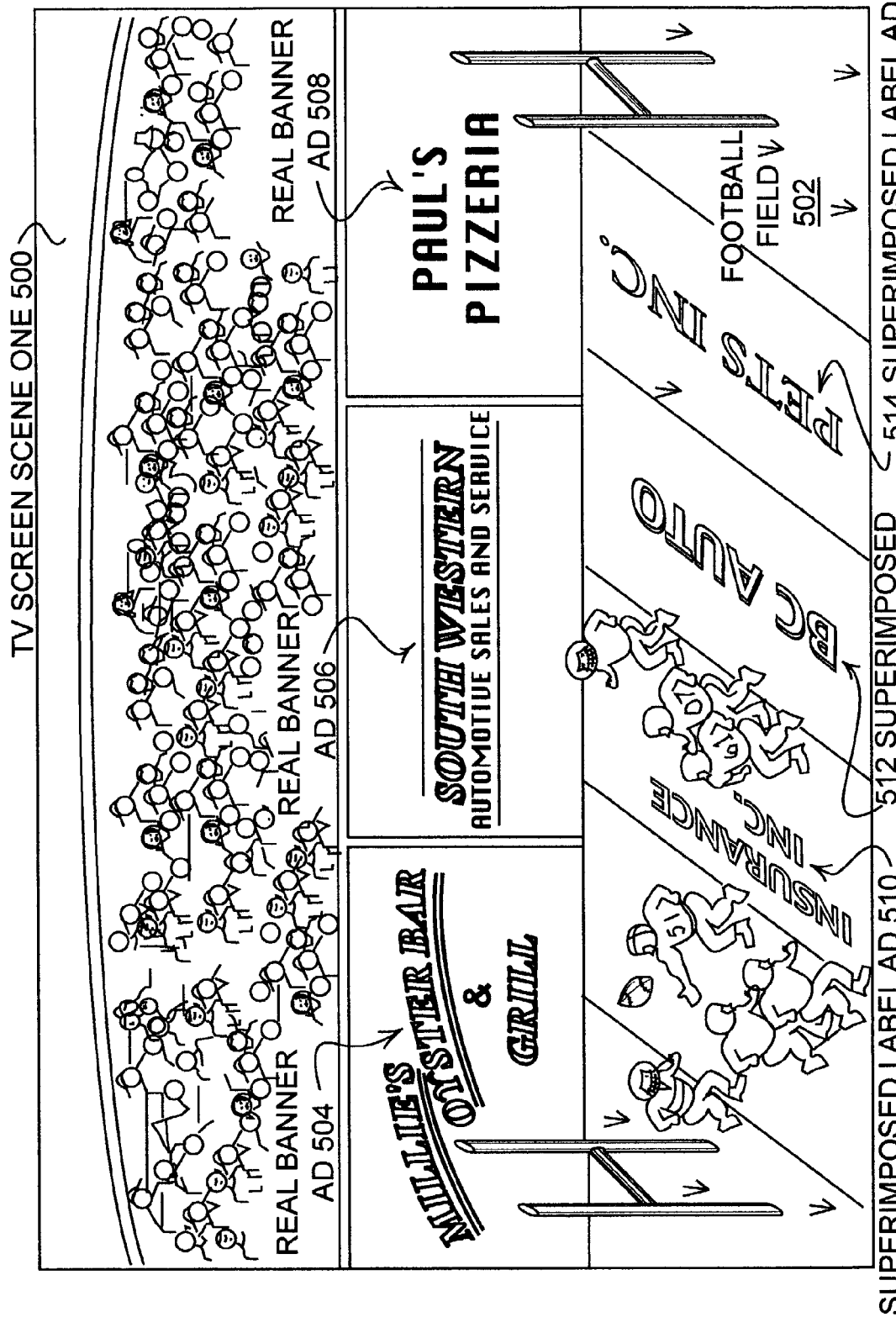
FIGS. 5a, 5b, and 5c are illustrations of scenes showing other implementations of the present invention.
Figure 5B:
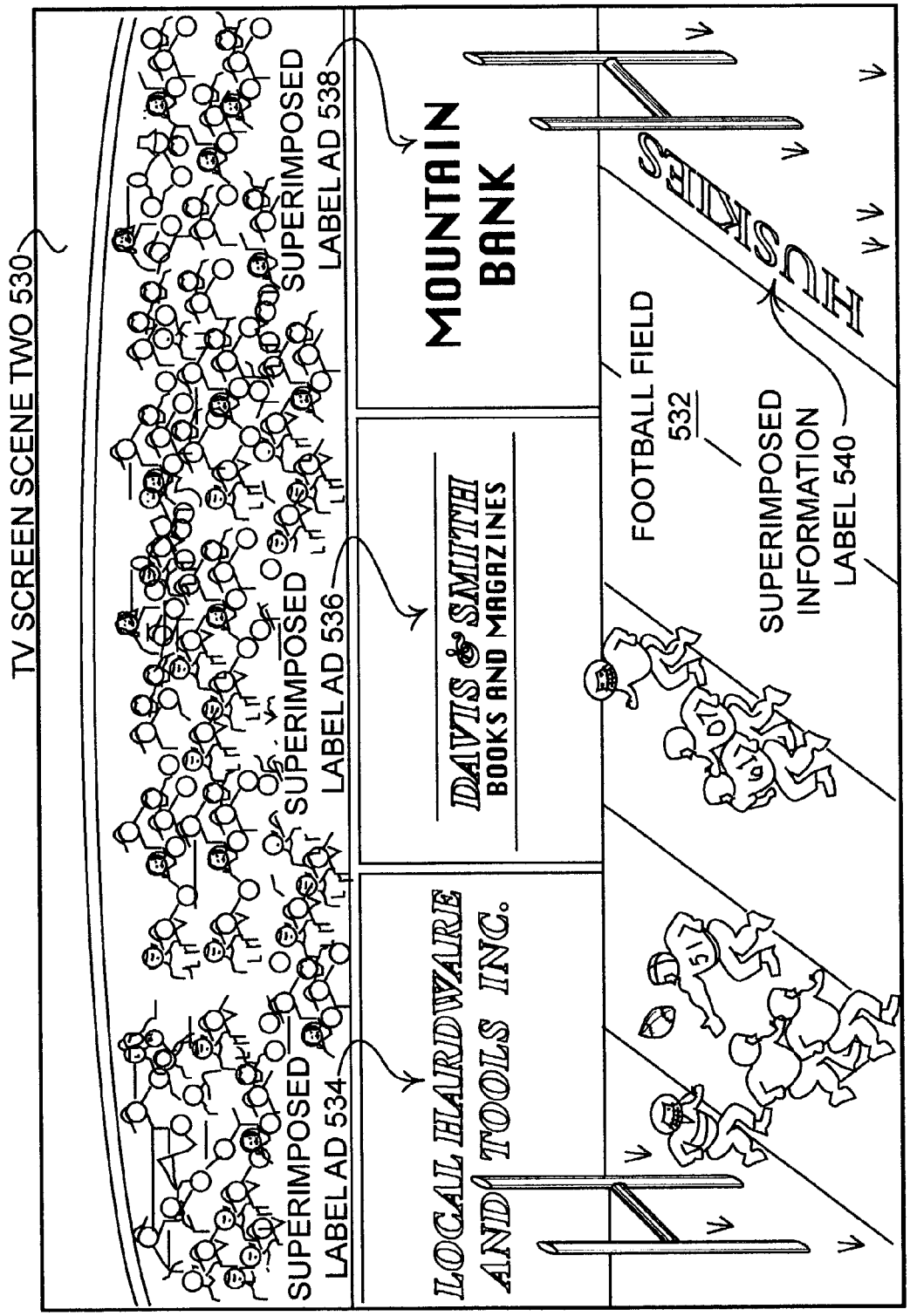
Figure 5C:
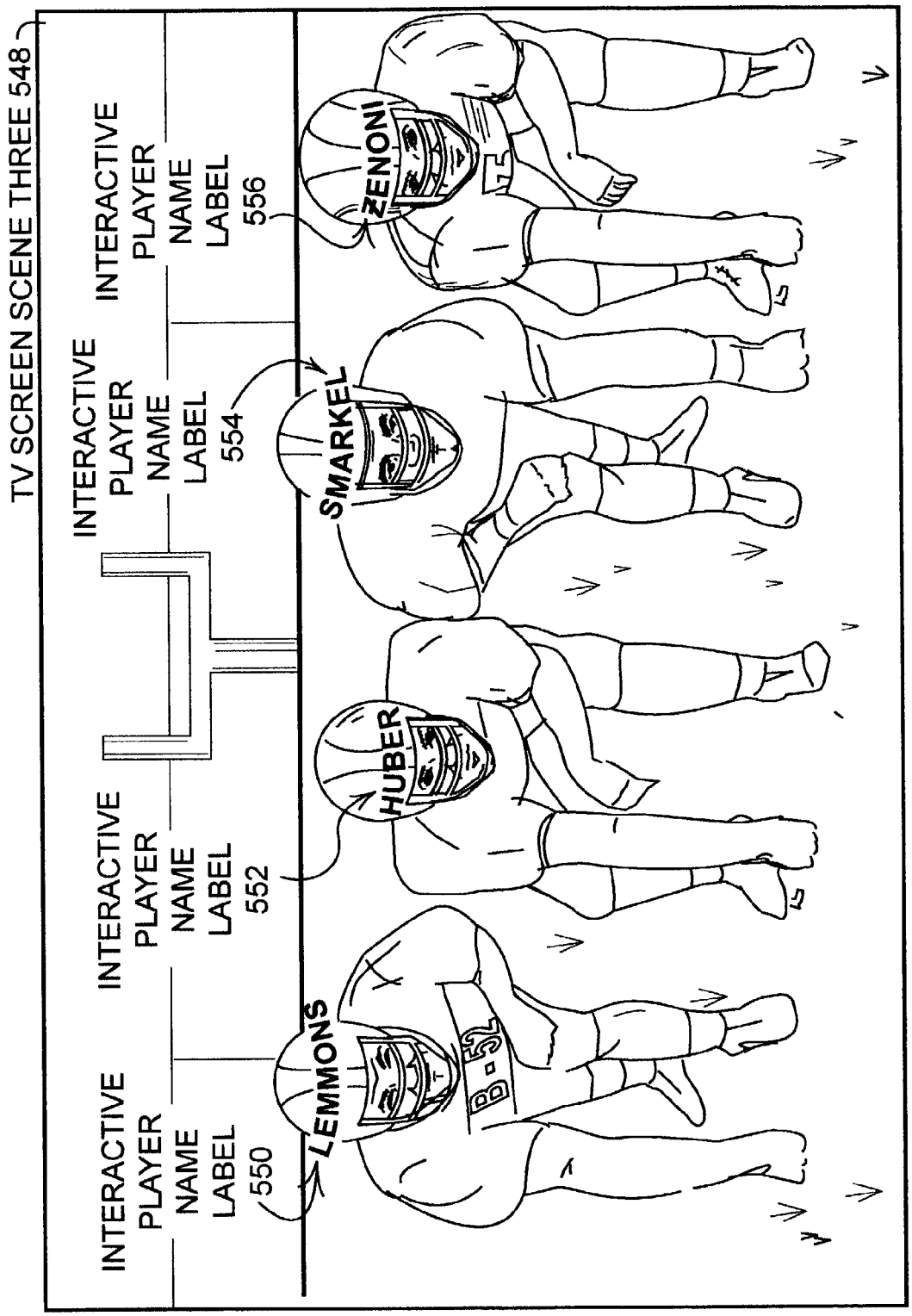

FIGS. 5a, 5b and 5c are illustrations of scenes showing other implementations of the present invention. As shown in FIG. 5a, a football game is displayed on a TV screen 500. The scene illustrates a football field 502 and viewing stands with real banner ads 504, 506 and 508 as typically found in sports arenas. Embedded advertising is supplemented in this pre-existing video signal by superimposing label ads 510, 512, and 514 on to the playing field 502. Thus, the final enhanced video signal appears to the viewer as though the field labels 510, 512, and 514 are inherent to the setting and look as if they are a natural part of the scene.

In FIG. 5b, a TV screen 530 is shown wherein label ads 534, 536, and 538 are superimposed over the top of the real banner ads that existed in the un-enhanced video signal. The enhanced video signal completely obscures the real banner ads present at the sports arena and appears to the viewer as though the superimposed labels 534, 536, and 538 are inherent to the setting and are a natural part of the scene. In this way, local embedded advertising can supercede national embedded advertising for different regions of a nationally broadcast program. FIG. 5b also illustrates an informational label 540 placed on the football field 532 denoting the end zone of the team on offense.

In FIG. 5c, a TV screen 548 is shown wherein interactive player name labels 550, 552, 554 and 556 are superimposed over the helmets of the football players in a game. In this instance, the enhanced video signal is not viewed as inherent to the setting and the labels are used as hot labels to bring up additional player information when accessed. This information can include personal, biographical or statistical data or the like for the accessed player.

FIGS. 6*a* and 6*b* are illustrations of scenes showing other implementations of the present invention. Each time that a label appears in a new scene, the label may be a different advertisement. As shown in FIG. 6*a*, scene one 602, the person 604 reaches into an open refrigerator 606 for a soda can 608. The label 610 is a "Coke" logo. In FIG. 6*b*, scene two 612, the same person 614, while standing beside the closed refrigerator 616, drinks from the soda can 618. The label 620 is now a "Pepsi" logo. Applying labels in this fashion may be done through pattern recognition and localized superimposition of ads, as will subsequently be explained.

FIG. 6*a* also illustrates the addition of an interactive tattoo label. In scene one 602 the person 604 is depicted with tattoo containing nationally recognized logo 650 superimposed on the persons arm. In this scene, the tattoo is overlaid with a transparent background to look like a natural part of the scene. Accessing this interactive hot label may link the viewer to either the home page of the company depicted in the nationally recognized tattoo logo or to an address and phone number of a local tattoo shop.

FIG. 7 is a schematic block diagram that generally illustrates one embodiment of the present invention. As shown in FIG. 7, an origination site 700 may provide content. Content comprises an un-enhanced video signal 702. The content may be created by a content provider such as a TV network, TV studio, a live broadcast, a server providing data such as an Applications Service Provider, an Internet Service Provider, or any other type of content provider that may be capable of sending content to viewers. The origination site 700 may be capable of generating the content itself, or may simply provide content that is supplied from an outside source 704 in the form of an un-enhanced video signal 706. The origination site 700 transmits the un-enhanced video signal 702 to a server 708.

Referring to FIG. 7, the server 708 interacts with a central computer 710 and applies a label 712 to the un-enhanced video signal 702. This label 712 may comprise any form of video enhancement, including video sequences, text or graphical images and may be in any format, or other graphical representation such as bitmap or GIF. The server 708 accesses on or more of the multiple data files a data files 722 contained in a central computer 710. There may be one data file for each advertiser, or one data file for each advertisement (label) and may comprise a label 712 that exists as graphical information within the data file. The data file 722 may also comprise placement and contour data 714 which may be obtained by use of existing computer recognition, physical manipulation, or other techniques. By using placement and contour data, the label either may be applied unobtrusively to the video signal, or may appear to be an obvious addition to the original video signal 702. Alternatively, the data file 722 may comprise secondary video streams that may be superimposed (overlaid) onto the original un-enhanced video signal 702.

Referring again to FIG. 7, the central computer 710 may also contain a database 716, as referred to in the description of FIG. 3*a*, which stores each advertiser name and additional information. The central computer 710 may also contain another database 718, as referred to in the description of FIG. 3*b*, which stores each advertiser name, associated attributes as well as a link 322, 324 to the label (as illustrated in FIG. 3*b*) or a label text file 326 and 328. Each entry for each advertiser in the database 718 (as previously illustrated in FIG. 3*b*) may be linked to the associated advertiser's data file 722 though a link 720. Again, the databases and the data files may be stored in a central computer or on multiple computers which can comprise a server located at a head-end or in a set-top box.

Referring to FIG. 7, the server 708 may incorporate existing pattern recognition software and techniques to provide one way in which available advertising space may be identified. However, identification of advertising space can be achieved by several methods as may be further seen in regards to the description of FIG. 14. The pattern recognition software may communicate with the attribute database 718, stored in the central computer 710. As previously discussed, the attributes may be actual objects or "blank space" attributes. The pattern recognition software may search the un-enhanced video stream 702 these actual objects or blank spaces. Once a pattern is identified, the server searches the attribute database 718 for a matching attribute. In the event that more than one company has listed the identified actual object or blank space as an attribute, selection criteria may be utilized to choose which advertiser will receive the label. A detailed discussion of criteria, process and application of the label is described in further detail with respect to FIG. 13.

Referring again to FIG. 7, once the server 708 has applied the label 712 which the server accessed from either the data file 722 or the attribute and text-label database 718, the output from the server is an enhanced video signal 724; that is, a video signal which has one or more labels applied to the video signal. The enhanced video signal 724 is transmitted via a link 726 to a set-top box 728. The link 726 may comprise a radio frequency link, satellite link, cable connection, or any other type of communication. The set-top box 728 receives and transmits the enhanced video signal 724 to a display device 730, such as a computer monitor or TV screen.

Figure 8:
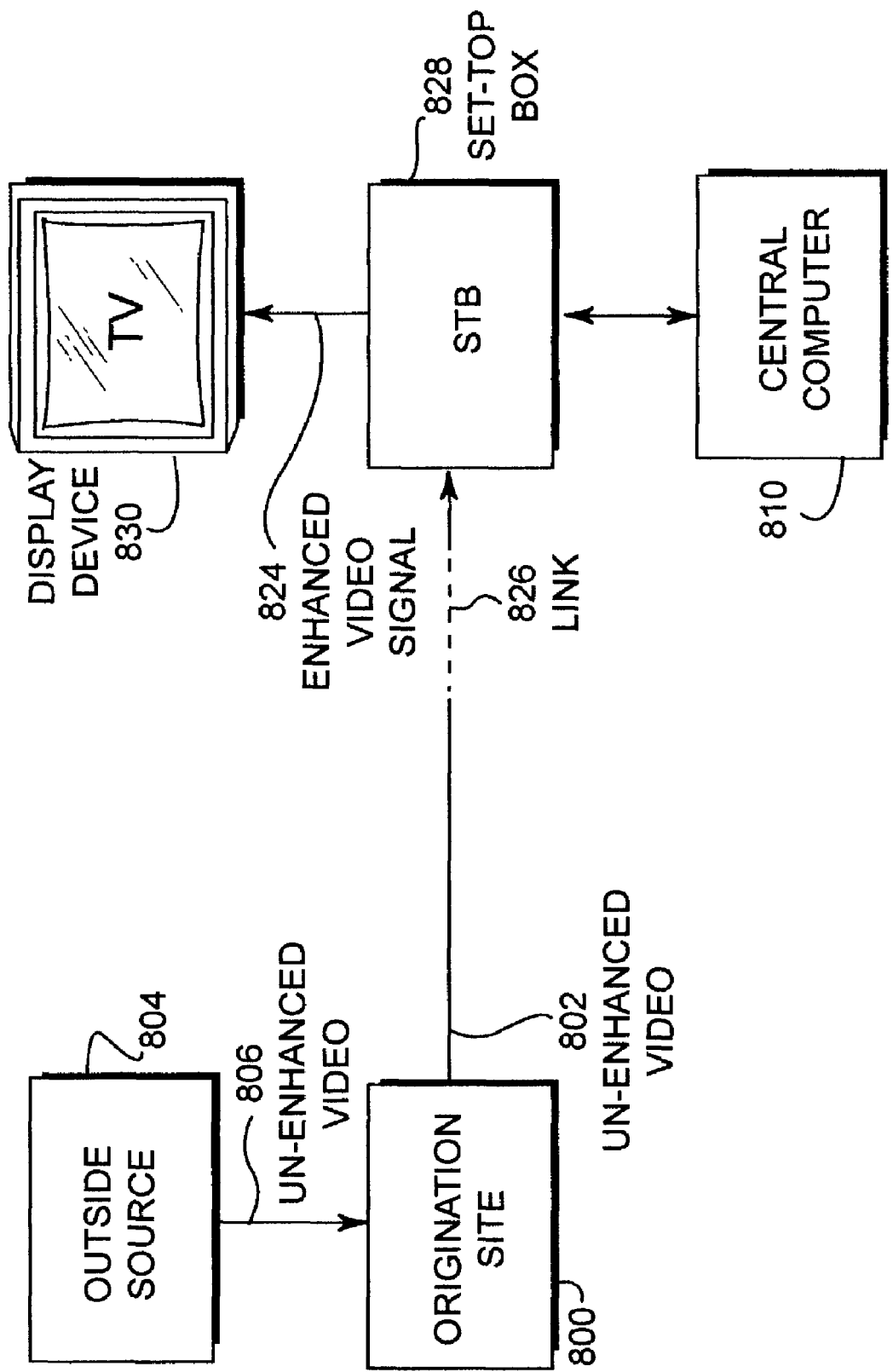
FIG. 8 is a schematic block diagram that generally illustrates another embodiment of the present invention.

FIG. 8 is a schematic block diagram that generally illustrates another embodiment of the present invention. The principles discussed in FIG. 8 are similar to those discussed in FIG. 7. In FIG. 8, the label is applied by the set-top box, rather than the server. Content comprises an un-enhanced video signal 802. The content may be created by a content provider such as a TV network, TV studio, a live broadcast, a server providing data such as an Applications Service Provider, an Internet Service Provider, or any other type of content provider that may be capable of sending content to viewers. The origination site 800 may be capable of generating the content itself, or may simply provide content that is supplied from an outside source 804 in the form of an un-enhanced video signal 806. The origination site 800 transmits the un-enhanced video signal 802 via a link 826, which again, may comprise a radio frequency link, a satellite link, or other type of link, to the set-top box 828. The set-top box 828 accesses the central computer 810 to apply one or more labels to the un-enhanced video signal 802 to produce an enhanced video signal 824 output. This enhanced video signal 824 is then sent from the set-top box 828 to a display device 830, such as a computer monitor or TV screen.

Figure 9:
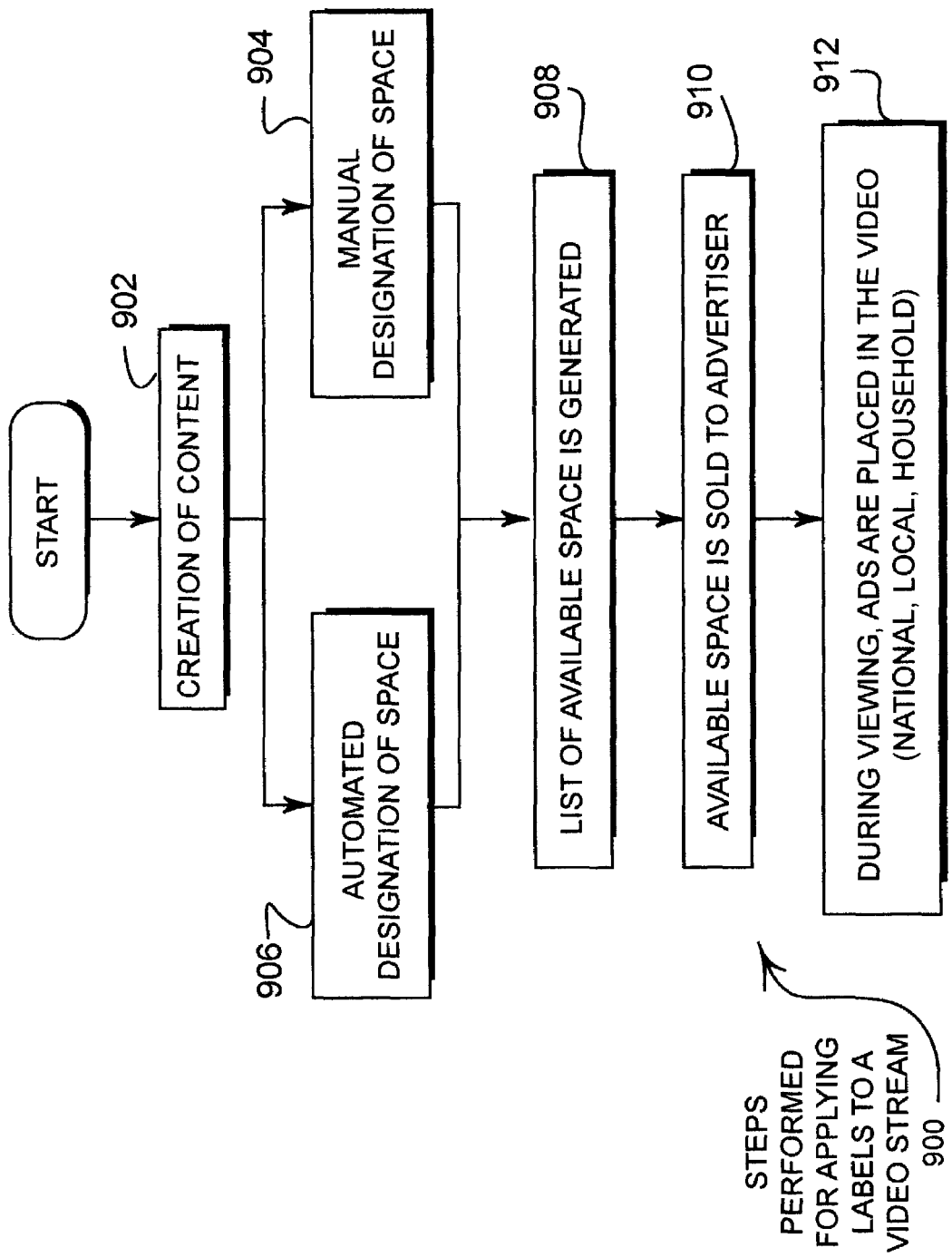
FIG. 9 is a flow diagram that illustrates the steps that may be performed in applying labels to a video stream.

FIG. 9 is a flow diagram that illustrates the steps performed in applying labels to a video stream 900. As shown in FIG. 9, content is created at step 902. As previously disclosed, the content may be created by a content provider such as a TV network, TV studio, a live broadcast, a server providing data such as an Applications Service Provider, an Internet Service Provider, or any other type of content provider that may be capable of sending content to viewers. The process is continued at step 904 where available advertising space is designated by manual methods. Such manual methods may comprise having an author, that is, a person examining the un-enhanced video signal; manually designate places within the current un-enhanced video signal that are available for advertising. Alternatively, the process may proceed from step 902, where the content is created, to step 906, where the designation of available advertising space is automated. Automatic methods of designating advertising space may include visual (pattern) recognition, or other techniques. The process proceeds to step 908, where a list of the available advertising spaces previously designated is generated. This list may be generated by a server containing a list of advertisers and their associated attributes. Proceed to step 910, where the available advertising space that has been recently designated is awarded, sold or given in some manner to an advertiser. Selling of advertising space may be accomplished by solicitation of companies, annual fees, random placement, automated selection (based on some sort of criteria or other choosing mechanism), or other ways. At step 912, labels are placed in the video while the video content is being shown on a display device, such as a computer monitor or television screen.

Labels may be representative of local or national companies and may be superimposed on a per-household basis. This individualized superimposition may be facilitated by utilizing affinity data, such as disclosed in U.S. Provisional Application serial No. 60/243,506, filed Oct. 26, 2000 entitled "COLLECTION OF AFFINITY DATA FROM TELEVISION, VIDEO, OR SIMILAR TRANSMISSION", now U.S. Non-Provisional application Ser. No. 10/046,618, filed Oct. 26, 2001 having the same title, and also disclosed in U.S. Provisional Application serial No. 60/275,295, filed Mar. 13, 2001 entitled "AFFINITY MARKING FOR INTERACTIVE TELEVISION", now U.S. Non-Provisional application Ser. No. 10/099,054, filed Mar. 13, 2002 entitled "AFFINITY MARKETING FOR INTERACTIVE MEDIA SYSTEMS", all of which are specifically incorporated herein by reference for all that they discloses and teach. Labels may also be superimposed on a house-by-house basis, and by collecting data received from personalized remote controls as disclosed in application Ser. No. 60/227,916 and Ser. No. 09/941,148 referenced above. In accordance with the above respective applications, affinity data provides information to a TV broadcaster as to whether or not an audience is actually engaged in the current TV video presentation, through use of a variety of sensors, as opposed to simply having the TV on and not watching the TV. The personalized remote is used to collect data regarding what TV shows are being watched by each different member of a household. Together, the use of technology from affinity data and personalized remotes may allow for personal targeting of advertisements.

Figure 10:
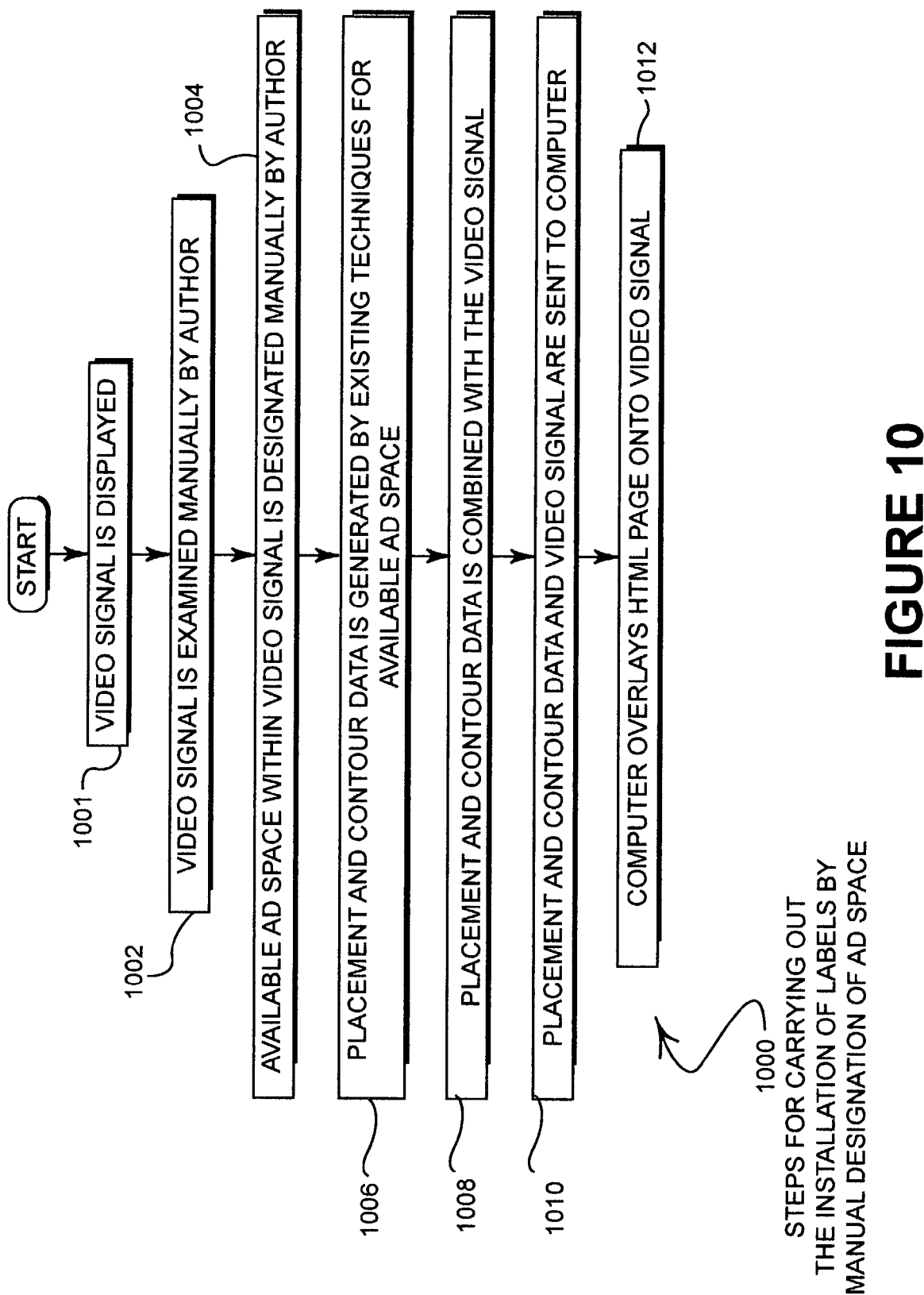
FIG. 10 is a flow diagram illustrating the steps that may be performed for the installation of labels by manual designation of available advertising space.

FIG. 10 is a flow diagram illustrating the steps for carrying out the installation of labels by manual designation of available advertising space 1000. The content, or video signal, is displayed in step 1001. In step 1002, the author, previously defined as the person examining the video signal, examines the video signal. The process proceeds to step 1004, where the author manually designates available advertising space within the un-enhanced video signal. That is, the author looks for possible places existing in the original un-enhanced video stream onto which to place advertisements. Such possible places may include actual objects, onto which a particular logo of a company may be applied, or blank spaces, onto which any advertiser desiring to place their advertisement on a blank space may utilize. Once the author identifies a possible placement spot for an ad, the author designates the identified possible placement spot as being available for an advertisement placement. Proceeding to step 1006, placement and contour data for the identified object, or blank space, which acts as the available advertising space, is generated. The placement/contour data may be obtained by use of existing computer recognition techniques, physical manipulation, or other techniques, and may be generated by a computer located at the head-end, the set-top box, or other site. Utility of the contour data may include making the label appear more naturally in the scene. As an example, if the object to which the label is applied is round, the label, as text or graphics or any visual enhancement, may be wrapped around the object's physical shape so that the label-enhanced object appears to look natural. By generating placement/contour data, the available advertising space is designated and comprises a boundary around the identified object.

Again referring to FIG. 10, in step 1008, the placement/contour data is combined with the video signal. In step 1010, the combined placement/contour data and video signal are accessed by the computer. The location of the computer may be at the head-end (transmission site), retransmission site, the set top box (household), or some other site. In step 1012, the label is applied to the un-enhanced video signal. As previously disclosed, the label may be applied by overlaying data, which may contain the label itself along with placement/contour data, onto the original un-enhanced video signal. The data may be in the form of a Hypertext Mark-up Language (HTML) overlay page, which is mostly blank except for the label that the HTML overlay page contains. In this way, only the label is visible as the video signal flows through the system. The computer overlays the HTML page onto the video signal, thus applying the label to selective areas of the video signal by using the coordinates given by the placement/contour data. The label may be color-coded or partially transparent such that the label appears to be part of the original broadcast to the viewer. Alternatively, the label may be presented as an obvious addition to the original video signal, as was previously illustrated in FIG. 4.

The label may constitute graphical, image or text information and may be in the form of an MPEG stream, a bitmap, a JPEG image, etc. The graphical, image or text information of the label may be stored locally in the set-top box, at the head-end, at a distribution point or may be accessed over the Internet or other network. As indicated above, an HTML overlay page may be used to combine the information of the label with the pre-existing video stream. However, any type of computer-generated bitmap can be used to produce a screen that can be combined with the pre-existing video signal in one or more frames.

In addition, the computer-generated bitmap need not just overlay the preexisting video image. For example, the combination of the video image and the label image may employ arithmetic or logical combinations of the bitmap information. Such combinations may employ raster ops common to windowed graphical user interface environments such as Microsoft Windows™. These arithmetic and logical combinations allow the label to replace or partially replace the pre-existing video image with the content of the label. Half toning and "see-through" labels can also be accomplished using such techniques. The unified video signal that is displayed to the viewer allows the label to then appear as an integral part of the displayed image. Hence, the process of superimposing the label content on the pre-existing video content can be accomplished by simply overlaying a computer generated bitmap on the pre-existing video content, which may also comprise bitmap information generated from an MPEG type of signal. Alternatively, the process of superimposing the label content on the pre-existing video content can be accomplished by actually combining the computer generated bitmap containing the label content with the pre-existing video content such as with arithmetic or logical combinations, as disclosed above. Further, commonly used color keying techniques, known in the television and computer arts and commonly referred to as "blue screen" and "chromakey", can also be employed. For example, the label content may include specific colors that have been designated to not replace the content of the pre-existing video content, or specific colors may be employed to define areas of replacement or combination. In this fashion, the "transparency" of the label content can be accomplished using color key techniques.

The process of selecting the label content can be accomplished in various ways. For example, the label content may be accessed over a network connection. This network connection may be based upon preferences stored in a set-top box or based upon a tag or marker as transmitted as part of the video content of the pre-existing video stream. In addition, the network connection may be an upstream connection to a server, such as a server located at the head-end or some distribution point that has stored label content that can then be downloaded to the set-top box either through the VBI or an out-of-band channel. In addition, the label content that is accessed in this fashion may be based upon preferences that are stored either at the head-end, access point or at the set-top box. In addition, the bitmap information of the label content may be generated from instructions that are downloaded from a network such as the various network connections described above. These instructions may comprise executable code that is capable of generating graphics or text at the set-top box level. Again, these can be based upon preferences.

While the foregoing description may employ references to a set-top box, it is specifically intended that any and all such description shall apply to any receiving unit operable to provide a similar function, including intelligent televisions, multimedia computers, satellite receivers, etc., and also applies to portable systems that may employ wireless networks to receive video transmission and that may employ wireless networks to access label information.

Figure 11:
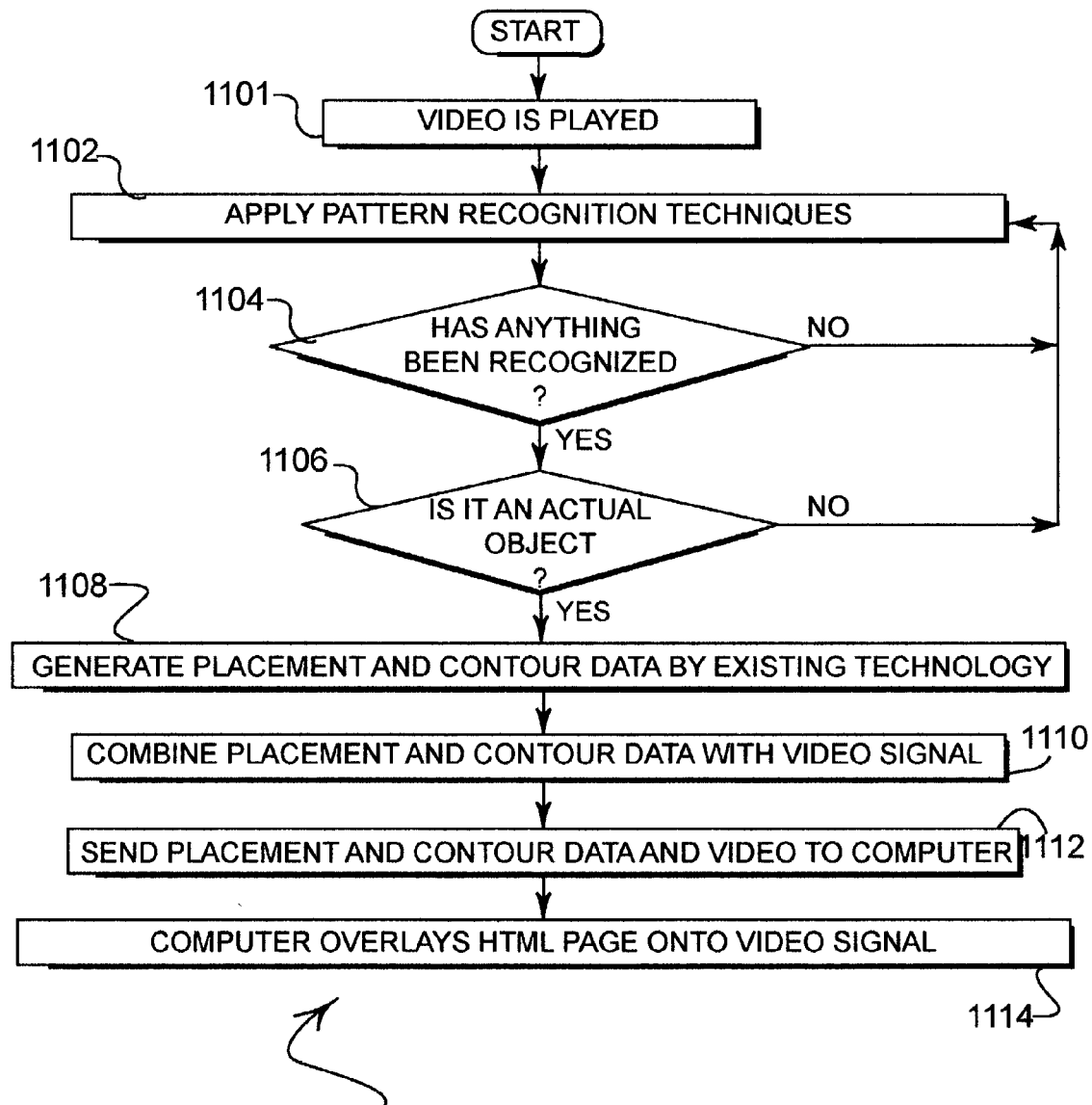
FIG. 11 is a flow diagram illustrating the steps that may be performed for the installation of labels by automatic designation of available advertising space and searching for actual objects.

FIG. 11 is a flow diagram illustrating the steps for carrying out the installation of labels by automatic designation of available advertising space and searching for actual objects 1100. In previous embodiments of the invention, the designation of available advertising space was performed by manual methods. Alternatively, the designation of available advertising space may be accomplished automatically. The following steps outline an automated process of designating available advertising space, followed by applying a label. In step 1101, the current un-enhanced video signal is displayed. The process proceeds to step 1102 where pattern recognition techniques may be applied to the current un-enhanced video presentation. These pattern recognition techniques may be performed by a computer at a head-end (transmission site), retransmission site, the set top box (household), or some other site. In step 1104, a query is made as to whether a pattern has been recognized. Recognized patterns may include actual objects. If a pattern has not been recognized, the process returns to step 1102 and continues applying the pattern recognition component to the current video presentation. Returning to step 1104, if some sort of pattern is recognized, the process proceeds to step 1106, where a query is made as to whether the recognized pattern is an actual object. If the recognized pattern is not an actual object, the process returns to step 1102 and continues employing the pattern recognition component. After the query at step 1106, if it is determined that the recognized pattern is an actual object, the process proceeds to step 1108 where placement and contour data is generated, which may include coordinates of the recognized object. As previously disclosed, placement and contour data may be generated by use of existing computer recognition techniques, physical manipulation, or other techniques. The placement/contour data may be generated by a computer located at the head-end, the set-top box, or other site. By generating placement/contour data, the available advertising space is designated and comprises a boundary around the identified object.

Referring to FIG. 11, the placement/contour data is combined with the video signal in step 1110. Thus, the output signal after step 1110 is an enhanced video signal. The placement/contour data and video signal, collectively referred to as the enhanced video signal, are accessed by the computer in step 1112. As previously disclosed, the location of the computer may be at a head-end (transmission site), retransmission site, the set top box (household), or some other site. In step 1114, the computer overlays a HTML page which is blank except for the label, onto the video signal. Thus, one or more labels are applied to the selective areas of the video signal by using the coordinates given by the placement/contour data.

Figure 12:
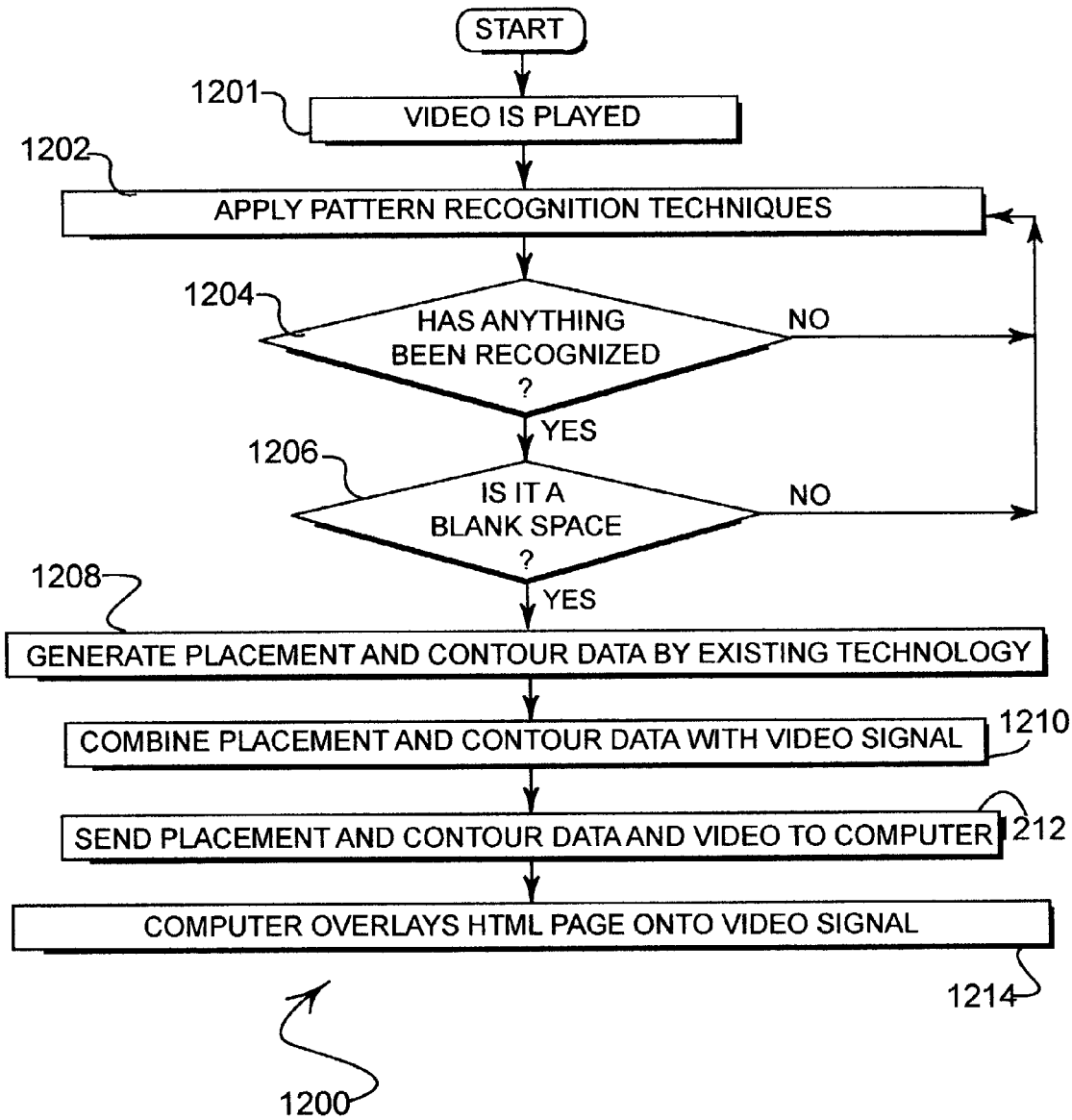
FIG. 12 is a flow diagram illustrating the steps that may be performed for the installation of labels by automatic designation of available advertising space and searching for blank spaces.

FIG. 12 is a flow diagram illustrating the steps for carrying out the installation of labels by automatic designation of available advertising space and searching for blank spaces 1200. The principles discussed in FIG. 12 are similar to the principles discussed in FIG. 11, with the pattern recognition component searching for a blank space instead of an actual object. As previously disclosed in FIG. 11, the designation of available advertising space is completed by use of automated methods. The process begins at step 1201, where the current un-enhanced video signal is displayed. The process continues at step 1202, where pattern recognition techniques may be applied to the current un-enhanced video signal. Again, the pattern recognition techniques may be performed by a computer at a head-end (transmission site), retransmission site, the set top box (household), or some other site. In step 1204, a query is made as to whether a pattern has been recognized. Recognized patterns may include blank spaces. If a pattern has not been recognized, the process returns to step 1204 and continues applying the pattern recognition component to the current video presentation. Returning to step 1204, if a pattern is recognized, the process proceeds to step 1206, where a query is made as to whether the recognized pattern is a blank space. If the recognized pattern is not a blank space, the process returns to step 1202 and continues employing the pattern recognition component. After the query at step 1206, if it is determined that the recognized pattern is a blank space, the process proceeds to step 1208 where placement and contour data is generated and may include coordinates of the recognized object. As previously disclosed, placement and contour data may be generated by use of existing computer recognition techniques, physical manipulation, or other techniques by a computer at the head-end, set-top box, or other site. By generating placement/contour data, the available advertising space is designated and comprises a boundary around the identified object.

Referring to FIG. 12, the placement/contour data is combined with the video signal in step 1210. The resultant enhanced video signal is accessed by the computer in step 1212. As previously disclosed, the location of the computer may be at the head-end (transmission site), retransmission site, the set top box (household), or some other site. In step 1214 the computer overlays a HTML page, which is blank except for the label, onto the video signal. Thus, one or more labels are applied to the selective areas of the video signal by using the coordinates given by the placement/contour data.

Figure 13:
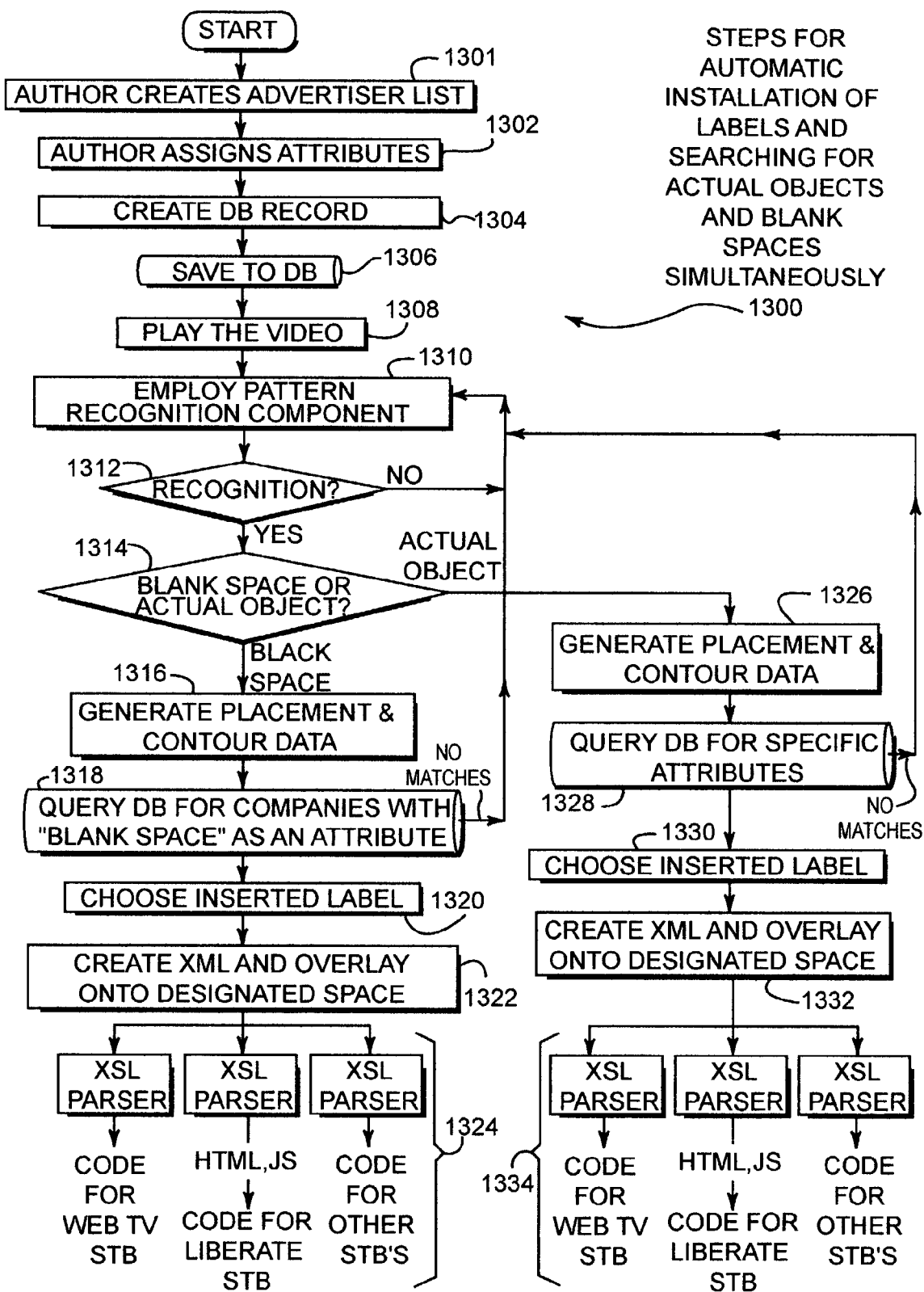
FIG. 13 is a flow diagram illustrating the steps that may be performed for the installation of labels, using automatic methods, in a manner which combines the processes of looking for an actual object and blank space simultaneously.

FIG. 13 is a flow diagram illustrating the steps for carrying out the installation of labels, using automatic methods, in a manner that combines the processes of looking for an actual object while searching for a blank space simultaneously 1300. As shown in FIG. 13, the author creates a list of advertisers at step 1301. At step 1302, attributes are entered and assigned to their respective advertisers. As previously defined, attributes are any actual object that is associated with the advertiser, or a blank space. Actual object attributes and blank space attributes are illustrated respectively in FIGS. 4 and 5. As previously discussed in FIG. 2, each advertiser may be accompanied by a list of additional information. A means of choosing an advertiser may also be a part of the additional information, such as or criteria. To exemplify, criteria, as entered by the author, may include the amount of funding given by the advertiser, how an advertiser's logo colors match the current background scene color, or any other multitude of means of ranking advertisers amongst each other.

Referring to FIG. 13, at step 1304 a database record of each company and their associated attributes, as illustrated in FIG. 3, is created. This record is saved to the database at step 1306. At step 1308, the video signal, such as a television sitcom, is played. At step 1310 a pattern recognition component is activated, which constantly searches the video content to identify patterns i.e., actual objects or be blank spaces. At step 1312, a decision is made as to whether or not a pattern has been recognized. If a pattern has been recognized, the process proceeds to step 1314. If a pattern has not been recognized, the process returns to step 1310 and continues searching the video signal for additional patterns. If a pattern has been recognized at step 1314, a decision is made as to what type of pattern is recognized. If the identified pattern is a blank space, the process proceeds to step 1316. At step 1316, placement and/or contour data is generated which may include coordinates of the identified object. As previously disclosed, the placement and contour data may be generated by use of existing computer recognition techniques, physical manipulation, or other techniques. By generating placement data, available advertising space is designated. At step 1318, the database is searched for an appropriate advertisement. If no appropriate advertisement is found, the process returns to step 1310 and continues searching the video signal. At step 1320, a label is selected based on attributes of the advertisers. If an appropriate advertisement is found, the process proceeds to step 1322. In the event that a blank space identified by the pattern recognition component was an attribute common to more than one advertiser, a choice based on criteria may be made as to which advertiser would be able to place labels in the blank space.

Referring back to FIG. 5, the pattern recognition component may recognize a blank space, such as arena panels, open ice or field, etc., onto which multiple advertisers may want to advertise (multiple advertisers had listed "blank space" as one of their attributes). An advertiser may be chosen based on how the advertiser's logo (label) looks in a particular blank space such as in a clear blue sky. If criteria are based on visual appeal and the logo is an unnatural or inappropriate object for that particular scene, such as a dragon, the logo and perhaps the company may be discarded. If the logo is visually appealing, such as typical banner add, the company with the said logo may be chosen to receive the label. Various criteria may be implemented depending on the nature of the video content, the author's discrepancy, or upon any variety of selection factors.

Referring again to FIG. 13, at step 1322, Extensible Markup Language (XML) code is created and superimposed (overlaid) onto the designated blank space within the un-enhanced video signal. The XML code is superimposed onto the un-enhanced video signal by use of the placement/contour data previously acquired in step 1316. In the final step 1324, code is translated, via an Extensible Scripting Language (XSL) parser, from XML into code for Web TV set-top boxes, HTML, Java Script (JS) (code for Liberate set-top boxes) and/or code for other set-top boxes.

Referring again to FIG. 13, the process returns to step 1314. If the pattern recognized is an actual object, the process proceeds to step 1326. At step 1326, placement and/or contour data is generated. Again, the placement and contour data may be generated by use of existing computer recognition techniques, physical manipulation, or other techniques. At step 1328, the database is searched for an appropriate attribute. If no appropriate attribute is found, the process returns to step 1310 and continues searching the video stream. If an appropriate attribute is found, the process proceeds to step 1330. Should the identified actual object be an attribute common to more than one advertiser, a choice based on criteria might be made as to which advertiser would receive the label.

This process returns to step 1330, where a label is chosen based on attributes of the advertisers. The process then proceeds to step 1332, where XML code is created and superimposed on the designated actual object. In the final step 1334, code is translated, via an XSL parser, from XML into code for Web TV set-top boxes, HTML, JS (code for Liberate set-top boxes) and/or code for other set-top boxes.

Figure 14:
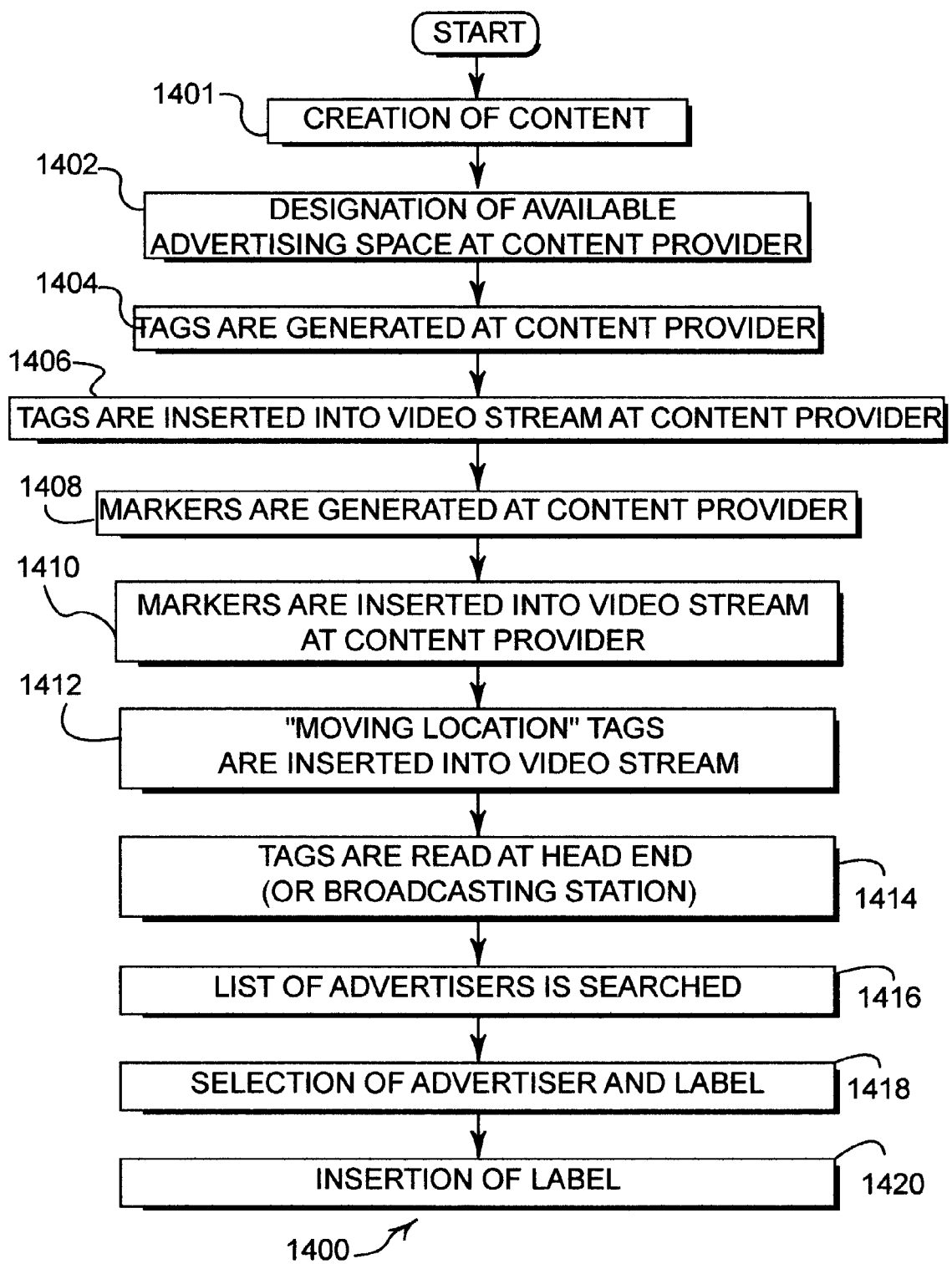
FIG. 14 is a flow diagram illustrating the steps that may be performed for the installation of labels by using tags and markers to describe advertising space.

FIG. 14 is a flow diagram illustrating the steps performed for the installation of labels by using tags and markers to describe advertising space 1400. As mentioned previously, pattern recognition techniques may provide a way in which available advertising space may be identified. However, identification of advertising space can be achieved by several methods. For example, available advertising space within the video stream may be defined by use of technology as disclosed in application Ser. No. 60/268,350 and Ser. No. 10/076,950 referenced above.

Referring to FIG. 14, content is created at step 1401. Proceeding to step 1402, designation of available advertising space takes place. As discussed in FIGS. 10 and 11, the designation of available advertising space may be achieved by automatic or manual methods and takes place at the content provider. If the available advertising space has been designated by automatic methods, it can then be checked and edited by manual methods. The process proceeds to step 1404 where tags are generated as disclosed in the above references. These tags describe the advertising space that was designated in step 1402. As previously disclosed, the advertising space may be an actual object or a blank space, and is referred to as an attribute. The tags define the location and perhaps contour of the identified attribute. That is, the tags may comprise a location or several defining locations, perhaps in x and y coordinates, and a contour of the object or blank space (attribute) identified. The tag may flag the attribute as being a blank space or an actual object. This placement and contour data may also be generated by use of existing computer recognition techniques, physical manipulation, or other techniques. The process proceeds to step 1406, where the tag is superimposed into the video stream at the content provider.

Referring again to FIG. 14, the process proceeds to step 1408 where markers are generated at the content provider in a manner disclosed in the above references. These markers indicate the position of a division between each video segment of the video stream. That is, the markers indicate the beginning and the end of each video segment within the video stream. The process proceeds to step 1410, where the markers are superimposed into the video stream at the content provider.

The process proceeds to step 1412, where a "moving location" tag may be superimposed into the video stream and may indicate the new location of an attribute on the screen in a manner such as disclosed in U.S. Provisional Application serial No. 60/354,745, filed Feb. 6, 2002 entitled "TRACKING MOVING OBJECTS ON VIDEO WITH INTERACTIVE ACCESS POINTS", which are specifically incorporated herein by reference for all that it discloses and teaches.

For example, an identified object, which may be refrigerator, may move slightly from one frame to the next. Such a tag would account for the refrigerator's new location and/or orientation, and this tag may comprise new x and y coordinates and contour data of the refrigerator. The tags and markers may be sent during the video's Vertical Blinking Interval (VBI). Any know standard for transmitting enhanced data, including Advanced Television Enhancement Forum (ATVEF), may be used. References made herein to the ATVEF specification are made for illustrative purposes only, and such references should not be construed as an endorsement, in any manner, of the ATVEF specification.

Referring again to FIG. 14, the process proceeds to step 1414, where the video signal, which has been enhanced with tags and markers, is transmitted from the content provider to a broadcaster or to the head-end where the tag is read. Alternatively, the broadcaster could read the tag, if the advertisement to be superimposed is a national advertisement. Referring again to step 1414, the head-end reads the tag marking the location of an object or blank space and providing other information such as object or blank space profile, size, type, or other information. The process then proceeds to step 1416 where the head-end queries a list of advertisers, as referred to in FIG. 3. A query is made as to whether the list contains an advertiser that has listed the identified object or blank space as one of the advertiser's attributes. Proceeding to step 1418, as previously disclosed, selection mechanisms may be employed to select the advertiser and the label at head-end. The label is consequently superimposed into the video stream at head-end at step 1420. The display size of the label may be determined by the coordinate and contour data provided by the tag.

Various embodiments of the present invention therefore provide embedded advertising that can be implemented locally or even on a household basis, which is the ultimate form of localized advertising. Localization of advertisements can be extremely effective especially when combined with personal preference and demographic data and can lead to a proliferation of local businesses. Furthermore, by adding labels to video content in a post-production environment, local advertising can be provided in a simple and inexpensive manner, versatility of choosing advertisers is provided, revenue of broadcasters may be increased, and so on. Labels are unobtrusive, non-intrusive, and do not compromise size, color, or continuity of the video content. Labels that are interactive may be activated by several methods, including clicking on the label with a hand-held device, or remote, moving a pointing device over the label, or other methods. Labels can transfer information back to the hand-held device for display/interaction, perhaps by a wireless or infrared link, send information back to a server for data aggregation, or perform any number of other actions. Further, a personalized hand-held device can be used in accordance with the present invention that allows the system to provide personalized information and allows several people to interact with the same program simultaneously. Such principles are disclosed in U.S. Provisional Application serial No. 60/227,916, filed Aug. 25, 2000 entitled "PERSONALIZED REMOTE CONTROL" now U.S. Non-Provisional application Ser. No. 09/941,148, filed Aug. 27, 2001 having the same title, both of which are specifically incorporated herein by reference for all that they discloses and teach.

Labels encourage impulse buying of products or services. Products and services may be directly related to the content being watched, or may provide additional information for the purchase of items that have no relevance to the current video content. Labels can tailor individual one-on-one advertising, allow the viewer to vote, perform other interactive responses, or facilitate access to the world-wide-web. Labels can display information in a number of different ways, such as on a relevant item, on a separate page, or on an unused portion of the video presentation. Traditional enhancements, such as a window or text-box on the side or bottom of the television screen may appear once the label is activated. A special small icon, perhaps called a "Buy-Con™," may appear in the corner of screen indicating to the viewer the availability of labels in the scene.

Labels may be installed automatically by use of existing pattern recognition technology. Patterns that are identified by the software may be actual objects that exist in the current video stream, or blank spaces that exist in the current video stream. Actual objects or blank spaces may be an appropriate place to superimpose a label. The patterns identified by the pattern recognition software are matched with the list of attributes to identify an applicable label, and the patterns are assigned placement and/or contour data. The placement/contour data is then used by a computer to apply the label in the current video stream.

Alternatively, the installation of labels may be achieved by manually installing advertising (labels) into the programming content such as disclosed in application serial No. 60/243,107 and Ser. No. 10/041,881, referred to above. Initially, manually installing advertising into the programming content may be done at the head-end (transmission site), at a retransmission site, or in individual households according to their demographics. The principles of placing labels on a household-to-household basis are disclosed in application Ser. No. 60/227,916 and Ser. No. 09/941,148, referred to above.

Further advantages of the present invention include the ability to change labels on a per-scene basis, and the ability to implement labels automatically or by manual methods. Labels may be superimposed by viewers from within the comfort of their own homes. In addition, because labels do not have to be interactive and can exist as part of the video signal, televisions not enabled for interactivity are still able to receive the labels. Thus, the application of labels may not be restricted to video signals, but labels may be applied to any type of signal, and any type of medium.

The various embodiments disclosed provide a system and method that allows post-production visual alterations to be added to a video stream. In this manner, broadcast and basic cable channels may provide embedded advertising to local companies in a simple and inexpensive manner. Visual alterations, or labels, may be superimposed into the video stream manually or automatically. Labels are an effective way to advertise, and labels may be superimposed into the video stream on a house-by-house basis. Labels may be personalized and localized. Labels may be applied to any form of viewing material, within any type of signal or medium. Labels may appear unobtrusively or obviously within the video content, and labels may be either interactive or non-interactive. Labels may change on a per-scene basis, and labels may be superimposed by a viewer.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of superimposing a label that contains informational material onto preexisting video content to supplement said pre-existing video content comprising:

identifying on said pre-existing video content an object, a class of objects, or a blank space for placement of a label;

storing a plurality of advertisers to create an advertiser list in a database;

assigning associated attributes in said database corresponding to advertisers on said advertiser list to create a database record of each advertiser and each advertiser's associated attributes;

determining if an advertiser listed on said advertiser list in said database will exhibit an advertisement in said pre-existing video by examining at least one of the object, class of objects, or blank space for placement of a label and comparing the at least one of the identified object, class of objects, or blank space to one or more of the stored attributes in the database record of each advertiser on said advertiser list;

querying the database record of each advertiser to choose an advertiser based upon advertiser information related to the stored attributes in the database record of each advertiser on said advertiser list;

selecting said label for placement on said pre-existing video content based on said database query;

creating label space within the pre-existing video;

describing said selected label and said label space with a markup language;

applying said selected label to said label space based upon said database query by superimposing said selected label onto said pre-existing video content so that said label appears as an integral part of a unified video signal; and presenting additional advertiser information from the database record of the chosen advertiser to a user based upon the applied selected label and the created label space.

2. The method of claim 1 wherein said step of superimposing said labels onto said pre-existing video content further comprises:

combining an additional video signal with said pre-existing video content wherein said additional video signal is transparent except for said label.

3. The method of claim 1 wherein said step of superimposing said label onto said pre-existing video content further comprises:

overlaying a computer generated bitmap on said pre-existing video content.

4. The method of claim 1 wherein said step of superimposing said label onto said pre-existing video content further comprises:

combining a computer generated bitmap with said pre-existing video content.

5. The method of claim 1 wherein said step of selecting said label comprises:

accessing said label over a network connection.

6. The method of claim 1 wherein said step of identifying a suitable location in said pre-existing video content comprises:

recognizing objects and blank spaces within said pre-existing video content.

7. The method of claim 6 wherein said step of recognizing objects and blank spaces within said pre-existing video content comprises:

manually identifying said objects and blank spaces.

8. The method of claim 6 wherein said step of recognizing objects and blank spaces within said pre-existing video content comprises:

automatically identifying said objects and blank spaces.

9. The method of claim 8 wherein said step of recognizing objects and blank spaces within said pre-existing video content comprises:

automatically recognizing said objects and blank spaces using video pattern recognition techniques.

10. The method of claim 1 wherein said step of identifying a suitable location on said pre-existing video content further comprises:

identifying locations and attributes of available label spaces.

11. The method of claim 1 wherein said step of superimposing said label onto said pre-existing video content further comprises:

overlaying a Hypertext Mark-up Language (HTML) page that is blank, except for the label, onto said content.

12. The method of claim 1 wherein said step of superimposing said label onto said pre-existing video content further comprises:

superimposing said label at a video signal transmission site.

13. The method of claim 1 wherein said step of superimposing said label onto said pre-existing video content further comprises:

superimposing said label locally at a video signal display site.

14. The method of claim 1 further comprising:

assigning an interactive link to said label.

15. A system for superimposing a label onto pre-existing video content comprising:

program code that identifies available advertising space;

a database for storing a plurality of advertisers to create an advertiser list in the database and associated attributes to create a database record of each advertiser and each advertiser's associated attributes;

a processor for determining if an advertiser listed on said advertiser list in said database will exhibit an advertisement in said pre-existing video by examining said identified advertising space, comparing the identified advertising space to one or more of the stored attributes in the database record of each advertiser on said advertiser list, querying the database record of each advertiser to choose an advertiser based upon advertiser information related to the stored attributes in the database record of each advertiser on said advertiser list, and for selecting said label for placement on said pre-existing video content based on said database query;

a label signal that contains said advertiser information to supplement said pre-existing video content; and a logical system that selects said label signal for placement on said pre-existing video content and applies said selected label signal based upon said database query and that superimposes said label signal onto said pre-existing video content based upon said database query and presents additional advertiser information from the database record of the chosen advertiser to a user based upon the selected label signal.

16. The system of claim 15 wherein said label signal further comprises:
    additional video content wherein said additional video content is transparent except for said label.

17. The system of claim 15 further comprising:
    an enhanced video signal comprising a computer generated bitmap overlaid on said preexisting video content.

18. The system of claim 15 further comprising:
    a network connection that accesses wherein said label signal over a network connection.

19. A method for superimposing a label onto video content comprising:
    receiving an un-enhanced video signal at a receiver;
    storing a plurality of advertisers to create an advertiser list in a database;
    assigning associated attributes in said database corresponding to advertisers on said advertiser list to create a database record of each advertiser and each advertiser's associated attributes;
    determining if an advertiser listed on said advertiser list in said database will exhibit an advertisement in said pre-existing video by examining at least one of an object, class of objects, or blank space for placement of a label and comparing the at least one identified object, class of objects, or blank space to one or more of the stored attributes in the database record of each advertiser on said advertiser list;
    querying the database record of each advertiser to choose an advertiser based upon advertiser information related to the stored attributes in the database record of each advertiser on said advertiser list;
    generating a bitmap image in a said receiver from a set of instructions based on said database query;
    selecting a label for placement on said pre-existing video content based on said database query;
    applying said selected label to said un-enhanced video in said receiver based upon said database query and applying said bitmap image to said un-enhanced video in said receiver so that said bitmap image appears as an integral part of an enhanced video signal;
    sending an enhanced video signal from said receiver to a display;
    presenting additional advertiser information from the database record of the chosen advertiser to said display based upon the applied selected label and the un-enhanced video signal.

20. The method of claim 19 wherein said step of generating a bitmap image further comprises:
    generating a product image that is added to said un-enhanced video signal.

21. The method of claim 20 wherein said step of applying said label further comprises:
    applying said label to said product image.

22. The system of claim 15 further comprising:
    program code that recognizes objects and blank spaces within said pre-existing video content.

23. The system of claim 22 wherein said recognition of objects and blank spaces within said pre-existing video content is performed manually.

24. The system of claim 22 wherein said recognition of objects and blank spaces within said pre-existing video content is performed automatically.

25. The system of claim 24 wherein said recognition of objects and blank spaces within said pre-existing video content is performed automatically by using video pattern recognition techniques.

26. The system of claim 15 wherein said label signal further comprises:
    an addition to the original signal.

27. The system of claim 15 wherein said logical system that superimposes said label signal further comprises:
    a reader for reading tags and markers information defining attributes of said pre-existing video content to determine suitability.

28. The system of claim 15 wherein said logical system that superimposes said label signal on said pre-existing video content at a video signal transmission site.

29. The system of claim 15 wherein said logical system that superimposes said label signal on said pre-existing video content is located at a video signal display site.

30. The system of claim 15 wherein said label signal further comprises:
    an interactive link.

31. The method of claim 14 wherein said step of describing said label and said location with a markup language further comprises:
    describing said label and said location with a hyper-textual markup language (HTML).

32. The method of claim 14 wherein said step of describing said label and said location with a markup language further comprises:
    describing said label and said location with an extensible markup language (XML); and
    translating said XML.

33. A method of superimposing a label onto pre-existing video content to supplement said pre-existing video content comprising:
    identifying on said pre-existing video content an object, a class of objects, or a blank space for placement of a label, said label containing informational material relating to a source of goods and services;
    storing a plurality of advertisers to create an advertiser list in a database assigning associated attributes in a said database corresponding to advertisers on said advertiser list to create a database record of each advertiser and each advertiser's associated attributes;
    determining if an advertiser listed on said advertiser list in said database will exhibit an advertisement in said pre-existing video by examining at least one of the object, class of objects, or blank space for placement of a label and comparing the at least one of the identified object, class of objects, or blank space to one or more of the stored attributes in the database record of each advertiser on said advertiser list;
    querying the database record of each advertiser to choose an advertiser based upon advertiser information related to the stored attributes in the database record of each advertiser on said advertiser list;
    selecting said label for placement on said pre-existing video content based on said database query;
    creating label space within the pre-existing video content;
    assigning an interactive link to said selected label that links to a website for said goods and services; and
    applying said selected label to said label space based upon said database query by superimposing said selected label onto said pre-existing video content so that said label appears as an integral part of a unified video signal; and presenting a website from the database record of the chosen advertiser to a user based upon the applied selected label and the created label space.

34. The method of claim 33 wherein said informational material comprises a logo.

35. The method of claim 34 wherein said informational material further comprises markup language code.

36. The method of claim 1 wherein said markup language further comprises a moving location tag.

37. The method of claim 36 wherein the moving location tag further comprises coordinates and contour data.

38. The method of claim 1 wherein the label is further selected based on affinity data.

39. The system of claim 15 wherein the label is further selected based on affinity data.

40. The method of claim 19 wherein the label is further selected based on affinity data.

41. The method of claim 33 wherein the label is further selected based on affinity data.

* * * * *

UNITED STATES PATENT AND TRADEMARK OFFICE
CERTIFICATE OF CORRECTION

PATENT NO. : 7,444,659 B2
APPLICATION NO. : 10/212289
DATED : October 28, 2008
INVENTOR(S) : Lemmons It is certified that error appears in the above-identified patent and that said Letters Patent is hereby corrected as shown below:

In column 19, line 13, in Claim 1, delete "preexisting" and insert -- pre-existing --, therefor.

In column 20, lines 2-3, in Claim 6, delete "content comprises:" and insert -- content for placements of said labels further comprises: --, therefor.

In column 21, line 10, in Claim 17, delete "preexisting" and insert -- pre-existing --, therefor.

In column 21, line 12, in Claim 18, delete "wherein said" and insert -- said --, therefor.

In column 21, line 46, in Claim 19, delete "display;" and insert -- display; and --, therefor.

In column 22, line 15, in Claim 28, delete "content at" and insert -- content is located at --, therefor.

In column 22, line 19, in Claim 30, delete "signal further" and insert -- further --, therefor.

In column 22, line 42, in Claim 33, delete "in a said" and insert -- in said --, therefor.

Signed and Sealed this

Fourteenth Day of April, 2009

JOHN DOLL
*Acting Director of the United States Patent and Trademark Office*